US011345052B1

(12) United States Patent
Johnston et al.

(10) Patent No.: US 11,345,052 B1
(45) Date of Patent: May 31, 2022

(54) EXTENSIBLE MAST DEVICE

(71) Applicant: AMAZON TECHNOLOGIES, INC., Seattle, WA (US)

(72) Inventors: John Edwin Johnston, Redwood City, CA (US); Christopher Clive Jones, San Francisco, CA (US); Carl Philip Taussig, Woodside, CA (US); Christopher Lorenzo Dunn, Los Gatos, CA (US); Mark Greggory Edstrom, San Jose, CA (US); David Jennings Dostal, Hanover, NH (US); Jose Arnoldo Marin-McDaniel, New Orleans, LA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/727,246

(22) Filed: Oct. 6, 2017

(51) Int. Cl.
*F16M 13/00* (2006.01)
*B25J 18/02* (2006.01)
*B25J 19/02* (2006.01)

(52) U.S. Cl.
CPC ........... *B25J 18/025* (2013.01); *B25J 19/023* (2013.01)

(58) Field of Classification Search
CPC .. F16M 11/28; F16M 11/046; F16M 2200/08; F16M 11/24
USPC ... 248/157, 161, 354.1, 354.2, 354.3, 354.4, 248/354.5, 354.6, 354.7
See application file for complete search history.

(56) References Cited

U.S. PATENT DOCUMENTS

| | | | |
|---|---|---|---|
| 3,213,573 A | 10/1965 | Bohr et al. | |
| 3,434,674 A | 3/1969 | Groskopfs | |
| 6,256,938 B1 * | 7/2001 | Daton-Lovett | F16H 19/064 138/119 |
| 10,100,951 B2 * | 10/2018 | Daton-Lovett | B64G 1/222 |
| 2006/0237617 A1 * | 10/2006 | Dwello | B63B 17/02 248/354.3 |
| 2009/0152431 A1 * | 6/2009 | Melic | E04G 21/3233 248/354.1 |
| 2010/0243849 A1 * | 9/2010 | Wang | E04G 25/06 248/354.4 |
| 2010/0308196 A1 * | 12/2010 | Lee | D06F 53/04 248/353 |
| 2011/0163216 A1 * | 7/2011 | Huang | B66F 1/06 248/354.7 |
| 2012/0042495 A1 * | 2/2012 | Bacon | E04G 25/06 29/428 |

* cited by examiner

*Primary Examiner* — Steven M Marsh
(74) *Attorney, Agent, or Firm* — Lindauer Law, PLLC

(57) ABSTRACT

An extensible mast device allows a payload to be supported at a controllable distance from a supporting device. A motor driving a flexible strip provides a force through the flexible strip to extend the mast. The extended strip may have a curved cross section that provides some rigidity. A set of telescoping sections may enclose the strip. One or more of the sections may be flexible. In the event of an impact between the extensible mast and an object, such as a user, the flexible section and the strip yield to the impact and collapse. The extensible mast may be easily reset by lifting it back to a vertical position, with the flexible strip reasserting the curved cross section and the flexible sections resuming substantially the same shape as before the impact. A robot may use the extensible mast to elevate cameras or other sensors to a higher vantage point.

20 Claims, 10 Drawing Sheets

EXTENSIBLE MAST DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
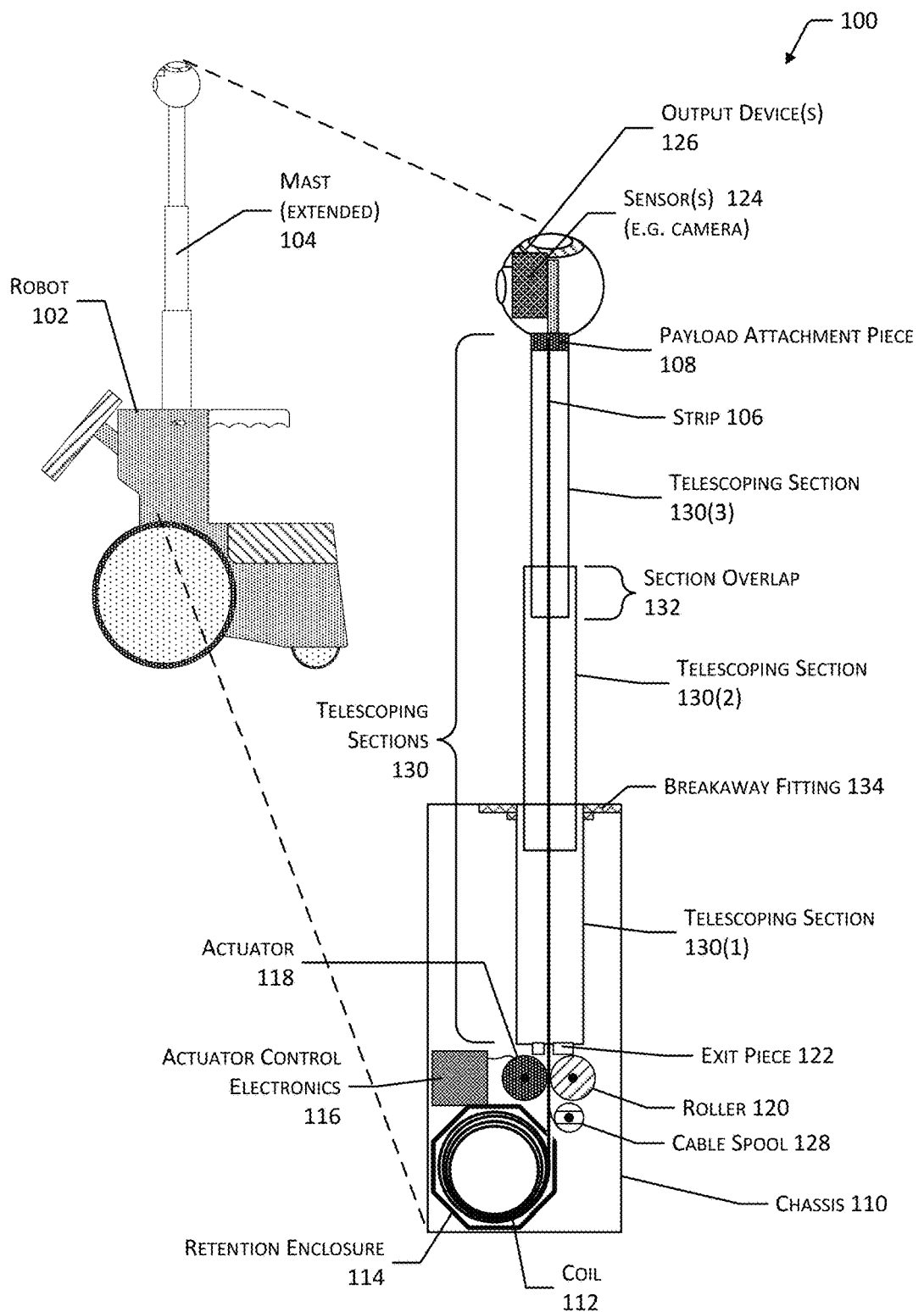
FIG. 1 illustrates a view of a robot with a mast that is extended by a strip of resilient material, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A variety of different tasks may be assisted by a robotic assistant, remotely operated vehicle, or autonomous vehicle. For example, a robotic assistant may assist in monitoring what is happening in another room of the home, staying in communication with other people, performing household chores, and so forth. In other examples, devices may be used to perform security patrols, inspect equipment, check on livestock, and so forth.

In many situations, it is advantageous to position a payload such as sensors, output devices, or both, at various heights. For example, it may be useful for the cameras of a robot to be able to see what is on a table or look out a window. Traditionally, such positioning meant building a device with a fixed structure that holds these components. However, this results in a device that is more expensive, heavier, and bulkier. As a result, such devices may be less affordable to potential users, may require more power to move, and may be unable to be easily transported or operate in space-constrained environments.

Described in this disclosure is an extensible mast device that may be utilized to position a payload at a desired height with respect to a chassis of a robotic assistant, remotely operated vehicle, autonomous vehicle, fixed structure, and so forth. The payload may include, but is not limited to, one or more of sensors such as cameras, output devices such as lights, and so forth. The extensible mast is able to retract into a compact volume, allowing use in smaller devices. The extensible mast is relatively lightweight, allowing for use in mobile devices. The extensible mast also provides several safety features that minimize or eliminate the damage in the event of a collision between another object, such as a person or furniture, and the mast. For example, the extensible mast may be configured to gracefully collapse on impact, preventing damage to either party. The extensible mast may be easily restored to operating condition by the application of a restoring force, such as a user lifting the mast back to the original position.

The extensible mast may utilize one or more strips of resilient material. This resilient material may comprise a metal such as spring steel, composite material such as fiberglass, shape memory plastic, shape memory metal, and so forth. Each strip may be configured to maintain a particular non-flat cross section. For example, the strip may comprise spring steel that has been formed to maintain a curved cross section. At a distal or far end of the strip, a payload attachment piece is affixed. The payload attachment piece provides physical support for the payload, such as a camera.

When the extensible mast is in the stowed or retracted configuration, most of the strip is contained within a coil housed within a retention enclosure. To deploy or extend the mast, an actuator such as a motor connected to a friction wheel that is in contact with a section of the strip rotates and pushes the distal end of the strip up. The curved cross section of the strip prevents the strip from collapsing as the force of the actuator urges the distal end up. During retraction, the opposite occurs, with the actuator pulling the strip back in for storage into the retention enclosure.

By controlling the length of the strip that is dispensed or retrieved, the height of the payload attachment piece, and the payload affixed to that piece, may be controlled. As a result, the extensible mast allows for positioning at any desired position between full retraction and full extension. The transitions between these different heights is smooth, and in operation the mechanism itself is quiet and unobtrusive.

As mentioned above, the extensible mast provides improved safety characteristics. In the event of a lateral impact, such as a collision between the mast and an object, the lateral force exceeds the lateral resistance afforded by the cross section, and the strip collapses. After the collision, the extensible mast may be returned to normal operation by applying a restoring force. For example, the mast may be lifted back to the normal position, at which time the strip will reassert the curved cross section and provide the supporting force to hold up the payload attachment piece. In another example the mast may be withdrawn to the fully retracted position and then redeployed.

Likewise, in the event of a vertical loading force, such as an object falling atop the mast, the vertical force exceeds the supporting capability of the strip, and the strip collapses. This prevents impalement injuries and also reduces the possibility for damage to the mast. As described above, the normal configuration may be restored by lifting the mast.

Increases in the amount of mass, maximum extension distance, and so forth may be obtained with other implementations. In one implementation, two or more strips may be used simultaneously. The distal ends of these strips may be affixed to the payload attachment piece, and they may be operated in conjunction with one another. In another implementation each of the two strips may be overmolded with an elastomer. The long edges of each strip may be configured with mechanical engagement features, such as a rib and notch. During deployment the rib on one long edge of a first strip may be inserted into the notch of another long edge on a second strip, temporarily joining the two. During retraction, the two are separated. In another implementation, two or more strips may be nested one against another. For example, a second strip may be at least partially within a concavity of a first strip. These nested strips may be joined at proximal and distal ends, and may be stowed within the same coil.

In some implementations the strips may be placed within a set of telescoping sections or another enclosing material. These sections may help improve the stability of the strip, prevent intrusion of contaminants, and so forth. One or more strips transfer the force from the actuator to one or more of the telescoping sections, causing the payload attachment piece and the telescoping sections to be extended. For example, the strips may provide a lift to the payload attachment piece, which is in turn attached to a telescoping section, resulting in that section being lifted.

In one implementation, the telescoping sections may comprise a rigid material, such as a polyvinyl chloride (PVC). In another implementation one or more of the telescoping sections may be flexible and resilient. For example, the telescoping sections of the mast may comprise a base section that is static and is positioned mostly within a chassis, a middle section, and an upper section. The base section and the upper sections may be rigid. The middle section may be resilient and flexible such that it deforms upon impact or overloading and resumes substantially the same shape once the force of the impact or overloading has been removed. For example, the wall of a resilient section may comprise an elastomer such as silicone rubber, which provides flexibility. Formed within, or attached to, the elastomer may be one or more resilient members. For example, the resilient members may comprise wires of spring steel that will bend under an applied force but will snap back when the applied force is removed. The resilient members may be arranged such that they are parallel to a long axis of the flexible section. For example, the resilient wires may be arranged equidistant from one another around the perimeter of the flexible section. In the event of a lateral impact or vertical overloading, the flexible section will collapse, as will the one or more strips within. To restore the mast to normal operation, the mast may be lifted back to normal, and the strip snaps back as does the sides of the flexible section.

The mast may also be used in conjunction with a breakaway fitting. The breakaway fitting is designed to separate the mast from the chassis upon application of a lateral force that exceeds a threshold value. For example, a lateral impact on the rigid base section may result in the operation of the breakaway fitting separating the mast from the chassis. The breakaway fitting may include a breakaway ring, through which the mast passes. The breakaway ring may be affixed to the mast. For example, the mast may be welded or glued to the breakaway ring. The breakaway ring has an annular body, with a circumferential engagement notch. The circumferential engagement notch is configured to mechanically engage a corresponding engagement rib that protrudes from an annular base latch ring. The base latch ring is affixed to, or part of, the chassis or other structure. In other implementations other configurations are possible, such as the use of multiple separate ribs and notches.

In the mounted configuration, the mechanical force between the engagement notch and the engagement rib maintains the mast in the operating position. In the event of a lateral force that exceeds the holding force provided between the engagement notch and the engagement rib, the breakaway ring separates from the base latch ring. After the event, the breakaway ring may be snapped back into place, and normal operation resumed.

The breakaway fitting improves the safety of the device while also reducing or eliminating damage in the event of a collision between an object and the mast. As a result, operation of the device is improved.

While the extensible mast is described in terms of vertical extension, other uses are possible. For example, the extensible mast may be used to extend the payload attachment piece and the payload laterally.

By using the hardware and the techniques described herein, a payload may be positioned at a particular distance from a chassis. As a result, the utility of a device may be improved. For example, a robotic assistant may use the extensible mast to perform tasks that involve viewing what is on a table, counter, outside of a window, and so forth.

Illustrative System

FIG. 1 illustrates a view 100 of a robot 102 with an extensible mast 104, according to some implementations. The extensible mast 104 may utilize a strip 106 to provide a lifting force, retraction force, or both. The dimensions of the strip 106 are such that the thickness of the strip 106 is less than the width of the strip 106, and the width of the strip 106 is less than the length of the strip.

The strip 106 comprises a resilient material that will maintain a particular shape when external forces are below a threshold level. For example, the strip 106 may comprise spring steel or fiberglass.

A cross section of the strip 106 as taken perpendicular to a long axis of the strip 106, may include one or more curves. For example, the strip 106 may have a curved or arcuate cross section. In another example, the strip 106 may have multiple curves, such as forming a "C" shape in cross section. The material is resilient in that displacement or deformation resulting from an applied force may change the shape or position, but when the applied force is removed the material resumes substantially the same shape.

The strip 106 has a proximal or near end and a distal or far end. The distal end of the strip 106 is attached to a payload attachment piece 108. The attachment may be made using one or more of mechanical interference fit, adhesive, welding, fastener, and so forth. The payload attachment piece 108 comprises a piece to which one or more payload elements are attached. For example, the payload attachment piece 108 may comprise a frame to which one or more sensors 124 may be attached.

In other implementations, the strip 106 may comprise other materials. For example, the strip 106 may comprise a shape-memory material such as shape-memory alloy or shape-memory polymer. The shape-memory alloy may comprise copper-aluminum-nickel, nickel-titanium, and so forth. The shape-memory polymer may comprise thermally activated polymers, electrically active polymers, and so forth. A controller may be used to active the shape-memory material to assume a particular shape.

A chassis 110 provides a structure for the mounting of various components of the mast 104. In some implementations the chassis 110 may be part of a larger device, such as a robotic assistant. Within the chassis is a coil 112 of a portion of the strip 106 that has not yet been deployed. In other implementations, the strip 106 may be retained on a spool or other arrangement. The coil 112 is located within a retention enclosure 114. The retention enclosure 114 may include walls, beams, or other structures that prevent the coil 112 from expanding within the chassis 110. In some implementations the retention enclosure 114 may be used to retain two or more strips 106.

Actuator control electronics 116 are connected to one or more actuators 118. The actuator control electronics 116 may provide a driving signal to the one or more actuators 118, receive data from sensors 124 such as limit switches, motor encoders, and so forth. The one or more actuators 118 may include rotary motors. The actuator 118 provides the force that displaces the strip 106. The strip 106 in turn transmits this force to the payload attachment piece 108, lifting or lowering the payload attachment piece 108. In some implementations, the same actuator 118 may be used to extend and retract the strip 106. In other implementations, a first actuator 118 may be used to extend the strip 106 while a second actuator 118 is used to retract the strip 106.

The distal end of the strip 106 exits the retention enclosure 114 and passes one or more rollers 120. The one or more rollers 120 may be used in conjunction with the actuator 118 to apply force to the strip 106. For example, the actuator 118 may comprise a motor with a friction wheel attached. The friction wheel is in contact with a surface of the strip 106. The roller 120 may be positioned opposite the friction wheel, keeping the strip 106 in contact with the friction wheel. As the actuator 118 rotates, the friction wheel rotates. The friction wheel then moves the strip 106.

In another implementation, the actuator 118 may drive a toothed wheel. The strip 106 may include sprockets that are then engaged by the toothed wheel. The force of the actuator 118 is then transferred via the teeth and sprockets to move the strip 106.

In yet another implementation, a spool (not shown) may be used to take up the retained portion of the strip 106. The actuator 118 may be used to rotate the spool. As a result, force from the actuator 118 may be transferred to the spool, and then in turn to the strip 106.

The strip 106 may pass through an exit piece 122. The exit piece 122 includes a passageway through which the strip 106 can pass. The passageway of the exit piece 122 may be curved to provide a cross section that corresponds to a desired cross section of the strip 106 when deployed. For example, if the desired cross section of the strip 106 is a "C" shape, the passageway of the exit piece 122 may be in this shape. In some implementations the exit piece 122 may be omitted or incorporated into the retention enclosure 114.

One or more of sensors 124, output devices 126, or other devices may be mounted to the payload attachment piece 108. The sensors 124 may include cameras, microphones, and so forth. The output devices 126 may include lights, speakers, and so forth. As described above, the payload attachment piece 108 is at the distal end of the strip 106. As the mast 104 is extended or retracted, the height of the payload attachment piece 108 and the devices thereon changes. For example, the robot 102 may extend the mast 104 to a height that places the sensors 124 at a height sufficient to view a tabletop.

In some implementations, communication between the payload at the payload attachment piece 108 and other devices, such as within the robot 102 or otherwise attached to the chassis 110, may be provided using one or more wires. For example, a cable comprising one or more wires may have a distal end at the payload attachment piece 108 and unused cable may be maintained by a cable spool 128. As the strip 106 is extended or retracted, moving the payload attachment piece 108, the cable spool 128 may extend or retract the cable. The proximal end of the cable may be coupled to a communication interface while the distal end is coupled to a camera.

In another implementation, a flexible printed circuit may be affixed to the strip 106. In still another implementation in which two or more strips are used, each strip may be used as an electrical conductor to transfer electrical power, signals, and so forth.

In some implementations the payload may communicate wirelessly. For example, the cable may be omitted and a wireless communication link may be used to transfer data between the payload and other portions of the robot 102 or other devices.

A single strip 106 is depicted in FIG. 1 for ease of illustration, and not necessarily as a limitation. As discussed below, in other implementations more than one strip 106 may be used.

Telescoping sections (sections) 130 may be used in some implementations. These telescoping sections 130 may enclose the strip 106, and are configured to fit at least partially within one another. For example, the base or static first telescoping section 130(1) may have a first inner diameter which is larger than an outer diameter of a second telescoping section 130(2). A third telescoping section 130(3), in turn, has an outer diameter which is less than an inner diameter of the second telescoping section 130(2). When retracted, the third telescoping section 130(3) may rest at least partially within the second telescoping section 130(2), while the second telescoping section 130(2) may rest at least partially within the first telescoping section 130(1).

The strip 106 passes through at least a portion of the telescoping sections 130. The enclosure provided by the telescoping sections 130 may prevent intrusion of contaminants, prevent air movement from disrupting the strip 106, and so forth. The telescoping sections 130 may also provide additional lateral stability and strength to the mast 104.

When the mast 104 is fully extended, at least a portion of adjacent sections 130 overlap with one another, producing section overlap 132. For example, adjacent sections 130 may overlap by at least 100 mm. This section overlap 132 may improve the stability of the mast 104, minimize binding during extension and retraction, and so forth.

In some implementations the telescoping sections 130 may be configured such that during extension the telescoping sections 130 are extended beyond the chassis 110 preferentially. For example, the second telescoping section 130(2) may be preferentially displaced beyond the perimeter of the chassis 110, followed by the third telescoping section 130(3). The retraction may be preferential as well, such that the third telescoping section 130(3) is withdrawn first, followed by the second telescoping section 130(2).

This preferential motion may be accomplished using a variety of techniques. In one implementation, friction at an interface between adjacent telescoping sections 130 may be configured to provide the preferential motion. Continuing the example, the friction between the first telescoping section 130(1) and the second telescoping section 130(2) may be less than the friction between the second telescoping section 130(2) and the third telescoping section 130(3). In another implementation, magnets may be arranged to control the separation of the various telescoping sections 130.

One or more of the telescoping sections 130 may comprise a rigid material. For example, the telescoping sections 130 may comprise polyvinyl chloride (PVC) plastic, acrylonitrile butadiene styrene (ABS) plastic, and so forth.

In some implementations, one or more of the telescoping sections 130 may be flexible and resilient. For example, the second telescoping section 130(2) may be constructed to be flexible and resilient. This is discussed in more detail below with regard to FIGS. 2 and 6. As described above, an excessive load either vertically or laterally on the strip 106 will result in the non-destructive collapse of the mast 104. The flexible and resilient telescoping section(s) 130 allows for the strip 106 to be enclosed while still retaining the capability for the non-destructive collapse of the mast 104.

In some implementations the telescoping sections 130 may be keyed or designed to maintain a particular orientation. For example, a ridge in one section 130 may fit within a slot of another section 130, keeping the sections 130 in the same alignment with respect to the chassis 110.

In other implementations, instead of or in addition to telescoping sections 130, other structures may be used to enclose the strip 106. For example, an accordion-folded or pleated bellows may have a first end affixed to the chassis 110 and a second end affixed to the payload attachment piece 108. As the strip 106 is extended or retracted, the bellows may expand and contract.

A breakaway fitting 134 may also be present. The breakaway fitting 134 is designed to separate the mast 104 from the chassis 110 upon application of a lateral force that exceeds a threshold value. For example, a lateral impact on the rigid sections 130(1)-130(3) may result in the breakaway fitting 134 separating the mast 104 from the chassis 110. After the event, the breakaway fitting 134 may be reassembled, and normal operation resumed. In one implementation, the breakaway fitting 134 may include a breakaway ring, through which the mast 104 passes. The breakaway ring may be affixed to the mast 104. For example, the mast 104 may be welded or glued to the breakaway ring. The breakaway fitting 134 is described in more detail below with regard to FIG. 8.

In other implementations, instead of, or in addition to, the breakaway fitting 134, one or more of the telescoping sections 130 may be configured to preferentially buckle under the influence of an external force. For example, one or more holes may be formed proximate to the base of the lowest telescoping section 130(1) to selectively compromise the structural integrity of that section 130. In the event of a lateral force on the extended mast 104 exceeding a threshold value, the portion of the telescoping section 130 buckles at the location of the one or more holes. To facilitate recovery, the telescoping section 130 may be designed to be replaced in the field. For example, a user of the robot 102 may be able to remove the buckled telescoping section 130 and install a replacement.

In other implementations other lift mechanisms may be used. For example, instead of or in addition to the strip 106, fluid actuators, interlocking linkages, helical coil lift systems, and so forth may be used to extend the mast 104.

Figure 2:
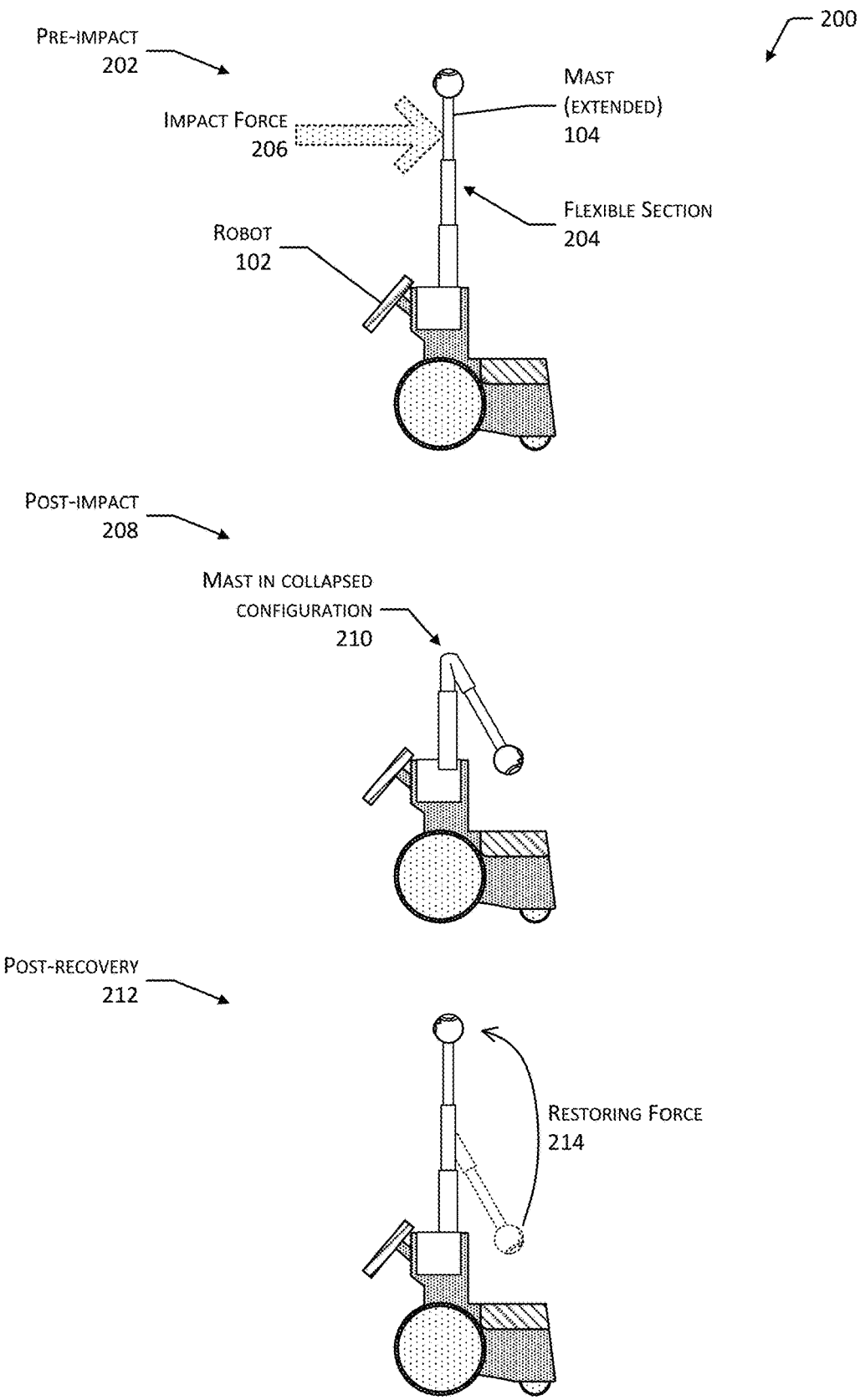
FIG. 2 illustrates a safe collapse and restoration of the mast, according to some implementations.

FIG. 2 depicts a scenario 200 in which the mast 104 safely collapses and is subsequently restored, according to some implementations. A pre-impact view 202 shows the robot 102 before a lateral impact force 206 is applied to the mast 104. The mast 104 includes at least one flexible section 204. One implementation of the flexible section 204 is described in more detail below with regard to FIG. 6.

The application of the lateral impact force 206, or other forces, such as vertical loading on the mast 104, render the strip 106 unable to maintain the extended shape and desired cross section. As a result, the strip 106 loses the ability to support the weight of the payload attachment piece 108 and other structures, such as the telescoping sections 130.

In some situations, a relatively small impact force 206 may result in a slight or temporary deformation of one or more of the strip 106 and the flexible section 204. However, the resilience of one or more of the strip 106 or the flexible section 204 may result in the mast 104 returning to the pre-impact 202 state with no further action. For example, the mast 104 may "snap back" into the pre-impact 202 state.

However, in other situations, the impact force 206 may be sufficient to cause the mast 104 to collapse. At 208 a post-impact view shows the mast 104 in the collapsed configuration 210 after a larger impact force 206 has impinged on the mast 104. In this illustration, the flexible section 204 and the strip 106 within are crimped, and the mast 104 is bent over.

At 212 a post-recovery view shows the mast 104 restored to a normal operating configuration. The mast 104 may be restored to this normal operating configuration by application of a restoring force 214. For example, a user may lift the end of the mast 104 up, bringing the mast 104 back to the vertical orientation. Once back to the approximately normal configuration, the strip 106 reasserts the desired cross section and supports the payload attachment piece 108 and so forth, while the flexible section 204 resumes substantially the same shape as before the impact. Normal operation may resume.

In other implementations the restoring force 214 may be provided by retracting the mast 104. For example, the collapsed mast 104 may be retracted and then extended to resume the normal operating configuration.

In some implementations, sensors 124 proximate to the payload attachment piece 108 may be used to determine if the mast 104 is collapsed. For example, an inertial measurement unit (IMU) attached to the payload attachment piece 108 may generate data indicative of the direction of local vertical. If that direction changes beyond a threshold value, such as in the event of the mast 104 collapsing and the IMU now being oriented generally upside down, the mast 104 may be deemed to be collapsed. Similarly, data from the IMU may be used to determine when the IMU has been returned to a normal vertical orientation.

Other techniques may also be used to determine if the mast 104 is in the normal operating configuration. For example, a current sensor may be used to measure the amount of current draw by the actuator 118. Continuing the example, the mast 104 may be determined to be collapsed when the amount of current draw exceeds a threshold value, such as the actuator 118 may experience when encountering increased resistance due to the collapsed mast 104.

Figure 3:
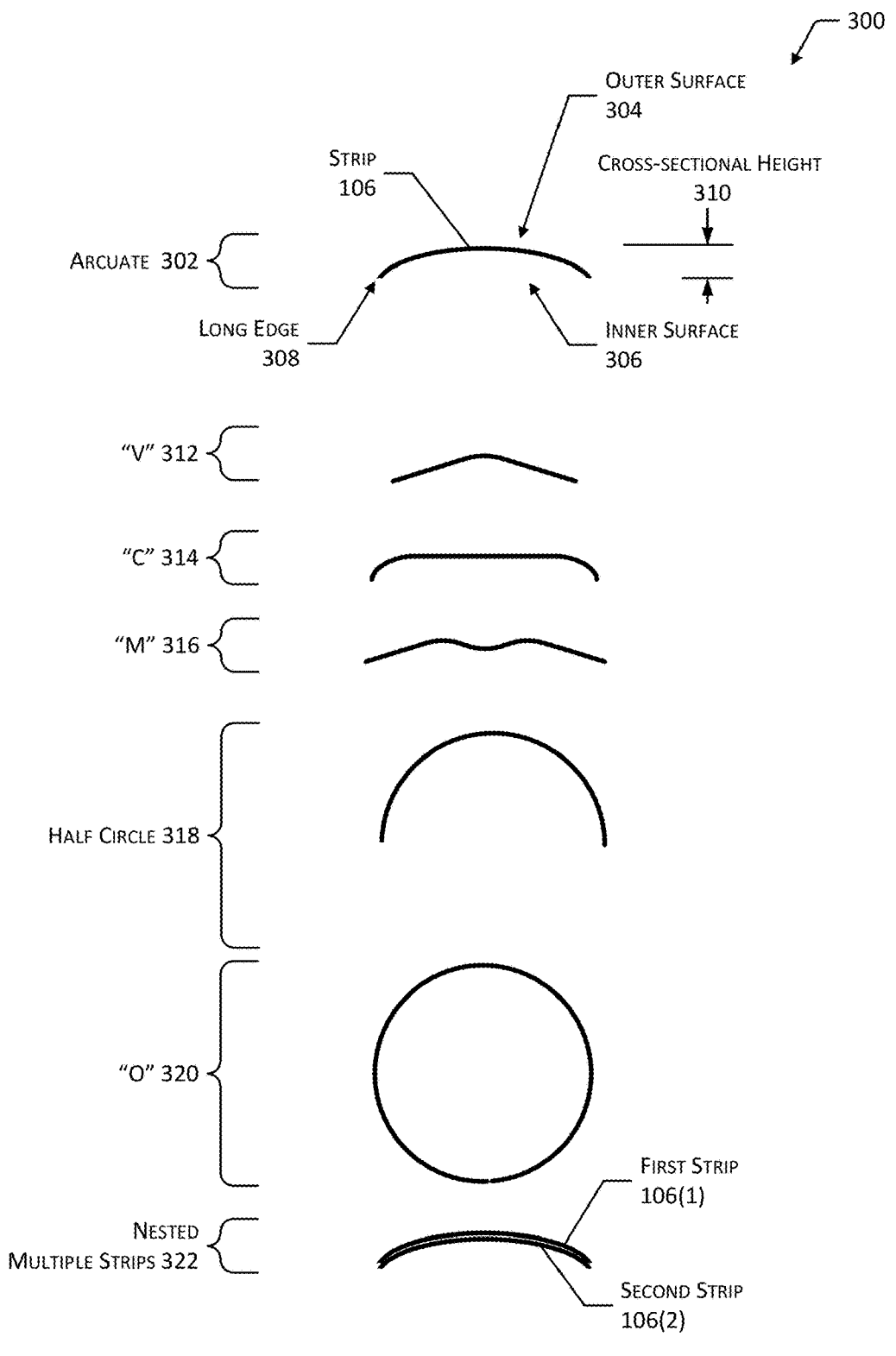
FIG. 3 illustrates several configurations of the strip that may be used to extend and retract the mast, according to some implementations.

FIG. 3 illustrates several configurations 300 of the strip 106 that may be used to extend and retract the mast 104, according to some implementations.

For purposes of discussion, and not necessarily as a limitation, the portion of the strip 106 that is between the actuator 118 and the payload attachment piece 108 may be designated as the extended strip.

The strip 106 may be used to push or pull an object by maintaining some rigidity along the extended strip 106. The extended portion of the strip 106 may maintain rigidity by using one or more curves in a cross section that is perpendicular to a length of the strip 106. These one or more curves allow the strip 106 to support a weight of the extended strip 106, the payload attachment piece 108 and payload, the telescoping sections 130 if present, and so forth. For example, at least one of the curves may have a bend with a radius of curvature of at least 1 millimeter.

While the extended strip 106 has the one or more curves, in some implementations the portion of the strip 106 that is in the coil 112 may have a different cross section. For example, one or more rollers or pressure between a roller and a spool around which the coil 112 is arranged may be used to flatten the strip 106 to facilitate storage. By flattening the strip 106, the retained portion of the strip 106 may be more easily coiled, coiled into a smaller radius of curvature, reduce the force necessary to stow the strip 106, and so forth.

An arcuate 302 cross section is depicted, in which the strip 106 has a single curve. The strip 106 has an outer surface 304 and an inner surface 306. For example, the inner surface 306 may comprise the surface that is on an interior of the concavity formed by the curve. The strip 106 has two long edges 308(1) and 308(2). The extended strip 106 has a first cross-sectional height 310. As described above, the portion of the strip 106 in the coil 112 may have a different cross-sectional height 310, such as due to compression of adjacent layers of the strip 106 on the coil. When the strip 106 is unconfined, the material of the strip 106 resumes the desired cross section.

Other non-flat cross sections may be used. A "V" 312 cross section includes a curve with a relatively small radius of curvature along a center of the strip 106. A "C" 314 cross section has tips of the long edges 308 curving in the same direction with a relatively small radius of curvature. An "M" 316 cross section includes three curves. A half-circle cross section 318 is depicted in which the cross section describes approximately a half-circle. An "O" 320 cross section is depicted in which the cross section is substantially circular. With the "O" 320 cross section, the strip 106 may comprise a single piece of material that maintains a longitudinal separation, such as produced by a gap between the long edges 308. In another implementation the "O" 320 cross section may be provided by a contiguous piece of material that is either formed as a single piece or is joined at the long edges 308. Other cross sections may also be used. For example, the strip 106 may be curved to form a tube such that the long edges 308 of a single strip 106 either touch or overlap. With the "O" 320 cross section the telescoping sections 130 may be omitted. A cable may extend within the "O" 320 cross section, such as to provide connectivity between the sensors 124 attached to the payload attachment piece 108 and the electronics below.

Different cross-sectional heights 310 may be selected for different applications. For example, a relatively short mast 104 may use a strip 106 with a 3 millimeter cross-sectional height 310, while a relatively tall mast 104 may use a strip 106 with a 10 millimeter cross-sectional height 310.

In some implementations two or more strips 106 may be nested adjacent to one another and may be used as a single strip 106. Nested multiple strips 322 are depicted here, in which an inner surface 306 of a first strip 106(1) is proximate to an outer surface 304 of a second strip 106(2). The multiple strips 106 may be in contact with one another. For example, a second strip 106(2) may be at least partially within a concavity of a first strip 106(1). In some implementations a lubricant may be placed between the strips 106. The multiple strips 106 may be affixed to one another at their respective distal and proximal ends. For example, the distal ends of the first strip 106(1) and the second strip 106(2) may be riveted together when joined at the payload attachment piece 108. This pair of strips 106 may then be retained with the same coil 112 in the same retention enclosure 114.

In some implementations the nested multiple strips 322 may be used as conductors to carry electrical power, signals, and so forth. For example, the first strip 106(1) and the second strip 106(2) may be separated by an electrical insulator, such as enamel coating, a plastic sheet, and so forth to prevent a short circuit between the strips 106. The first strip 106(1) may be used as a first conductor and the second strip 106(2) may be used as a second conductor.

Figure 4:
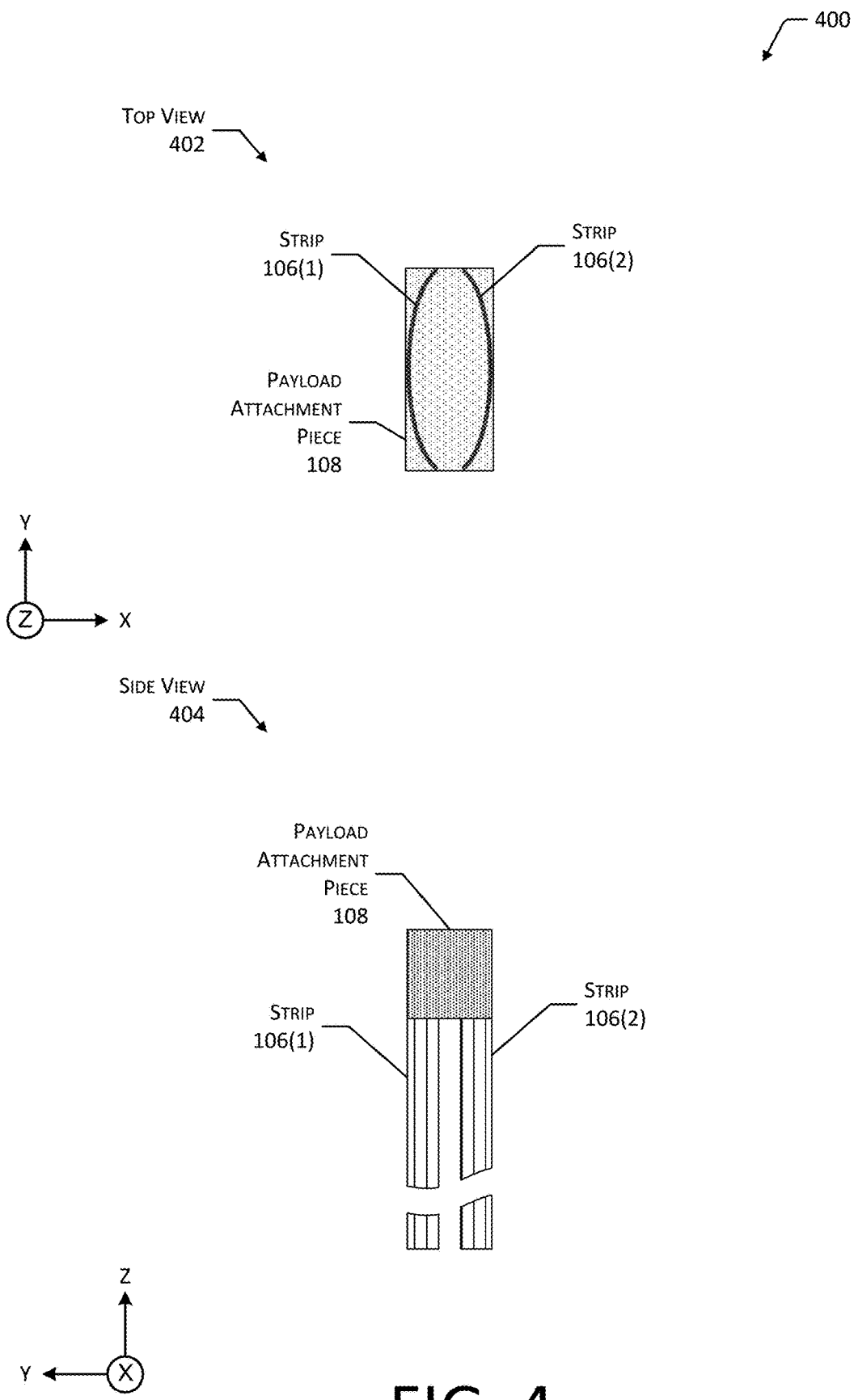
FIG. 4 illustrates a top and side view of a dual strip configuration, according to some implementations.

FIG. 4 illustrates views 400 of a dual strip 106 configuration, according to some implementations. The mast 104 may comprise a pair of strips 106. This pair may comprise a pair of individual strips 106 or a pair of nested multiple strips 322, with each nested multiple strip 322 having one or more strips 106 therein.

A top view 402 and a side view 404 show the dual strip 106 configuration. In the top view 402, a first strip 106(1) and a second strip 106(2) are positioned such that their inner surfaces 306 are proximate to one another. In another implementation, the strips 106(1)-106(2) may be positioned such that their outer surfaces 304 are proximate to one another. The first strip 106(1) and the second strip 106(2) are joined to the payload attachment piece 108. In some implementations, a space or a gap between the first strip 106(1) and the second strip 106(2) may be maintained. In other implementations, the long edges 308 of the first strip 106(1) may be in contact with the long edges 308 of the second strip 106(2).

In some implementations the first strip 106(1) and the second strip 106(2) may be deployed as depicted, with the interior of their respective concavities facing one another, without being joined using mechanical engagement features or other techniques.

The side view 404 depicts the payload attachment piece 108 atop the pair of strips 106(1) and 106(2). The pair of strips 106(1) and 106(2) are arranged such that they are substantially parallel to one another when extended.

In one implementation, when retracted the first strip 106(1) may be stowed within a first retention enclosure 114(1) while the second strip 106(2) is stowed within a second retention enclosure 114(2).

In another implementation, when retracted the first strip 106(1) and the second strip 106(2) may be flattened and stowed next to one another in a single retention enclosure 114. One or more of the first strip 106(1) or the second strip 106(2) may be overmolded with an elastomeric material.

During typical operation, one or more actuators 118 are configured to extend the same length of the first strip 106(1) and the second strip 106(2), keeping the payload attachment piece 108 level. For example, a single actuator 118 such as a rotary motor may drive a gearing system that moves the first strip 106(1) and the second strip 106(2) in unison. In other implementations, different lengths may be extended to tilt the payload attachment piece 108 to a desired angle.

Compared to the single strip 106, the first strip 106(1) and the second strip 106(2) in this configuration may provide increased load capability, stability, resistance to lateral or vertical forces, and so forth. However, this configuration retains the safety features described above, such as the graceful collapse as described above with regard to FIG. 2.

Figure 5:
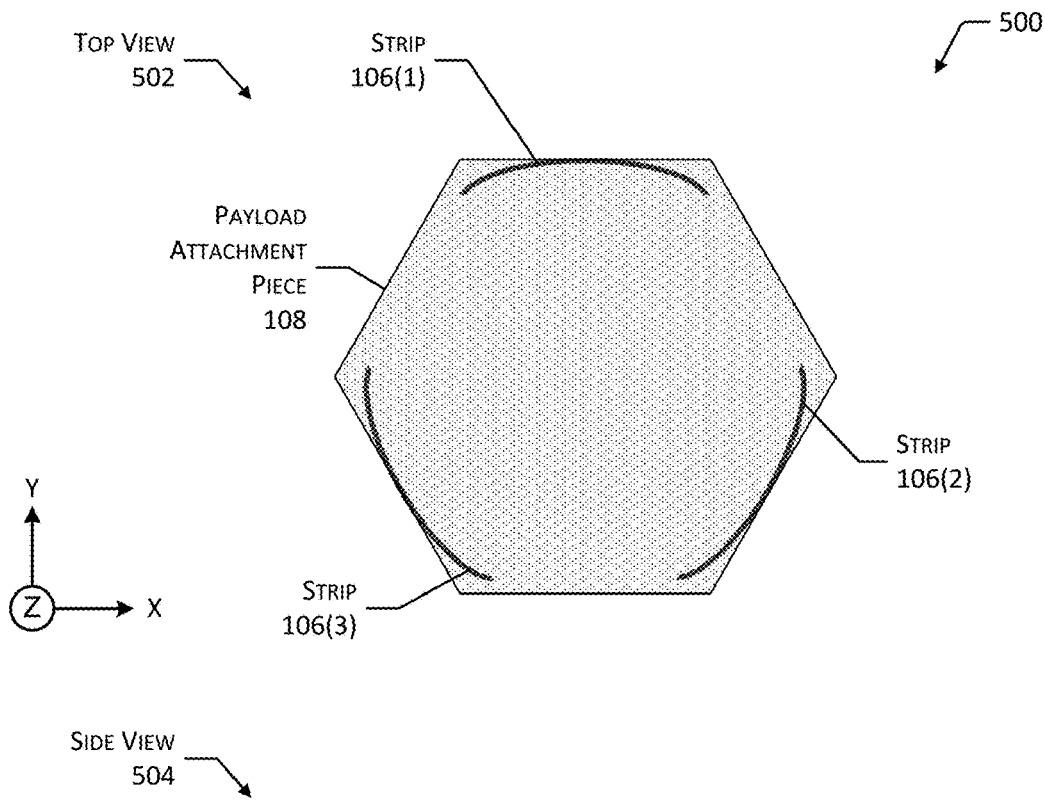
FIG. 5 illustrates a top and side view of a triple strip configuration, according to some implementations.
Figure 5:
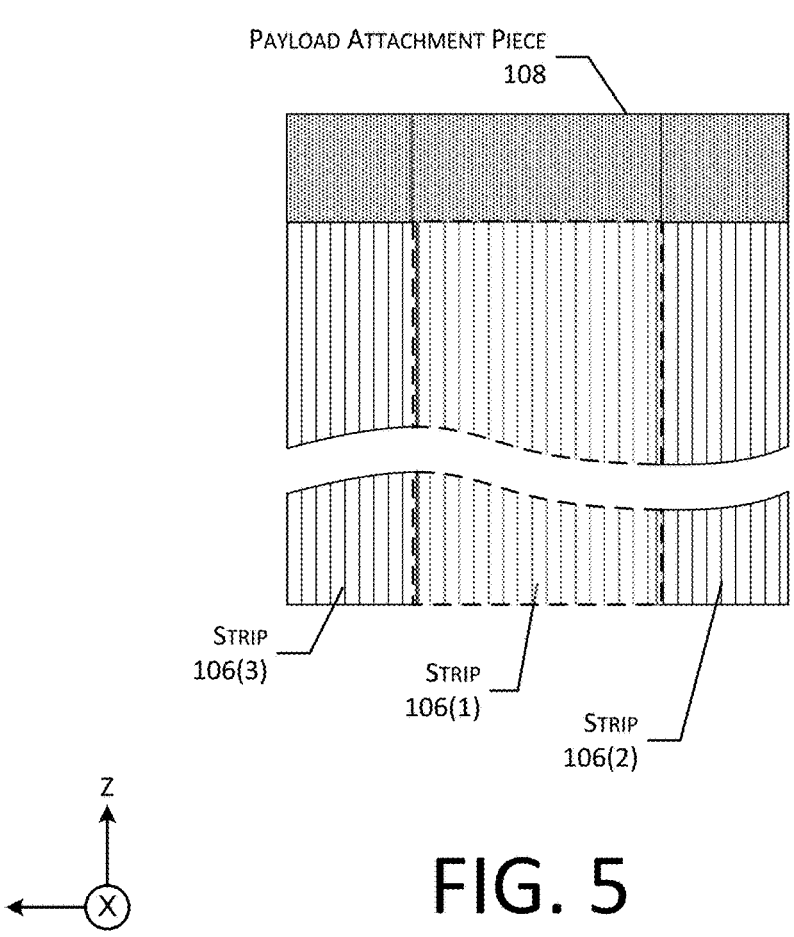

FIG. 5 illustrates views 500 of a triple strip configuration, according to some implementations. As shown here, the mast 104 may comprise three strips 106(1)-106(3). Each strip in the trio may comprise an individual strip 106 or nested multiple strips 322, with each nested multiple strip 322 having one or more strips 106 therein. When retracted, each of the three strips 106(1)-106(3) may be stowed within their respective retention enclosures 114(1)-114(3).

As shown in a top view 502, the payload attachment piece 108 may be hexagonal, with a strip 106 attached to every other side of the hexagon. As a result, the strips 106(1)-106(3) are equidistant from one another. In this illustration the inner surface 306 of the strips 106 are proximate to a longitudinal centerline of the mast 104. In other implementations, the strips 106 may be arranged such that their outer surfaces 304 are proximate to the longitudinal centerline of the mast 104.

During typical operation, one or more actuators 118 are configured to extend the same length of the strips 106(1)-106(3), keeping the payload attachment piece 108 level. In other implementations, different lengths may be extended to tilt the payload attachment piece 108 to a desired angle.

Compared to the paired configuration of FIG. 4, this configuration may provide increased load capability, stability, resistance to lateral or vertical forces, and so forth. However, this configuration retains the safety features described above, such as the graceful collapse as described above with regard to FIG. 2.

In other implementations, the mast 104 may utilize other numbers of strips 106. For example, the mast 104 may incorporate four strips 106(1)-106(4).

Figure 6:
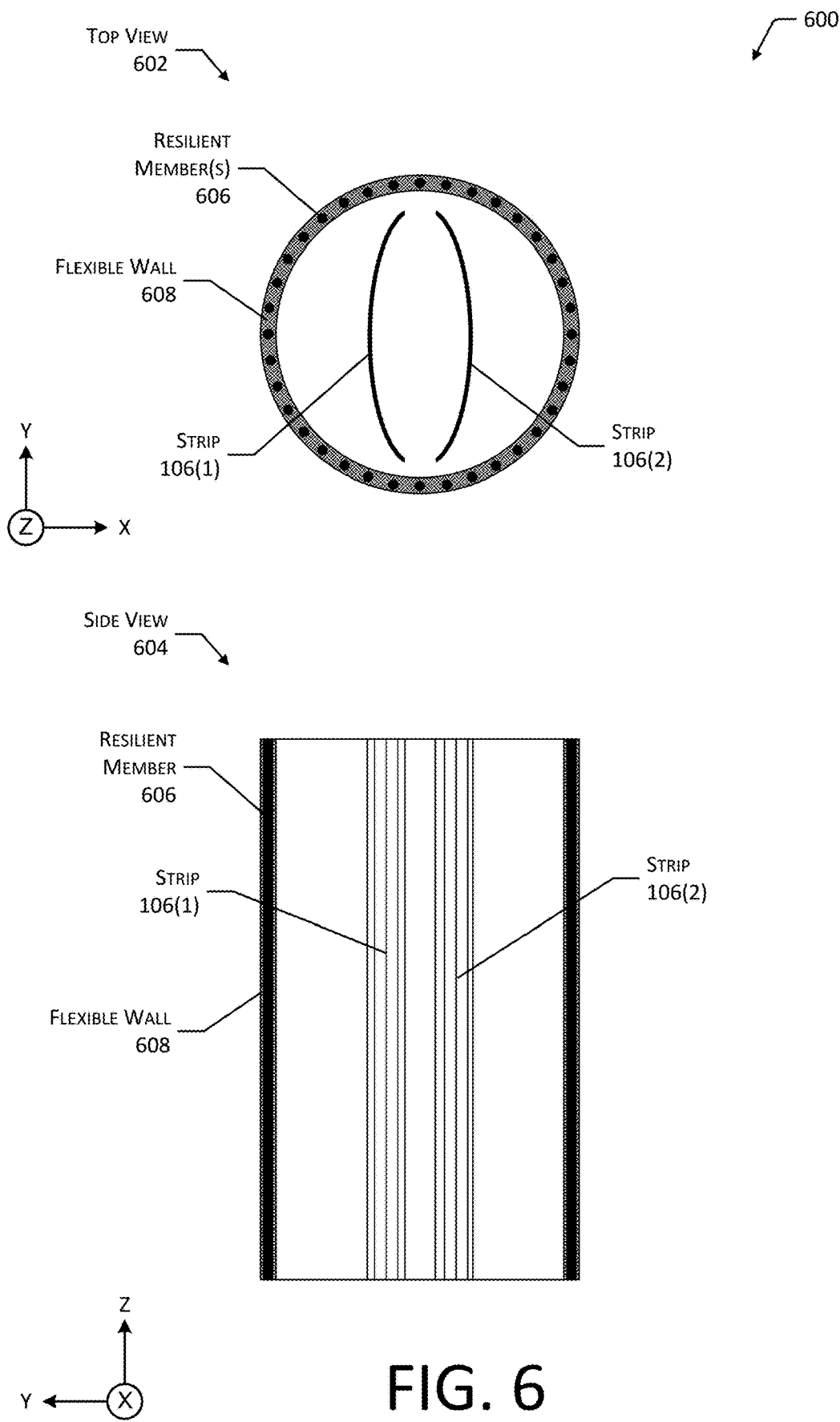
FIG. 6 a top and side view of a flexible section of the mast, according to some implementations.

FIG. 6 illustrates views 600 of a flexible section 204 of the mast 104, according to some implementations. A top view 602 depicts a circular cross section of the flexible section 204. Within the flexible section 204 are shown the first strip 106(1) and the second strip 106(2) of the implementation described above in FIG. 4. However, any number of strips 106 or the configurations discussed herein may be enclosed within the flexible section 204 or other telescopic sections 130.

The flexible section 204 may comprise one or more resilient members 606 that are arranged around or within a perimeter of the flexible section 204. The resilient members 606 comprise a resilient material, such as the strips 106. For example, the resilient members 606 may comprise spring steel wires or rods. The resilient members 606 may be configured such that the long axis of each resilient member 606 is substantially parallel to a long axis or longitudinal axis of the flexible section 204. In some implementations the resilient members 606 may be canted or angled slightly to facilitate a graceful collapse upon application of a vertical load. For example, the resilient members may comprise 32 gauge piano wire.

A flexible wall 608 comprises the structure of the flexible section 204. For example, the flexible wall 608 may comprise an elastomer such as silicone rubber. The flexible wall 608 may comprises a material with a Shore A durometer hardness of between 45 and 60. In other implementations the flexible wall 608 may comprise a woven material, such as a fabric, a flexible sheet material such as 100 mil plastic sheeting, and so forth.

In some implementations, the resilient members 606 may be embedded within the material of the flexible wall 608. For example, the silicone rubber of the flexible wall 608 may be overmolded onto the resilient members 606.

The resilient members 606 provide support for vertical loads and help maintain the overall shape of the flexible section 204. The flexible wall 608 in turn maintains the relative arrangement of the resilient members 606. In some implementations the flexible wall 608 may be resilient as well. For example, the flexible wall 608 may comprise silicone rubber that will substantially return to a previous shape after removal of an incident force.

As described above with regard to FIG. 2, in the event of an impact force 206 or vertical overload force, the flexible section 204 non-destructively buckles, causing the mast 104 to collapse. In this way, damage to both the colliding object and the mast 104 is reduced or eliminated entirely. The mast 104 may be restored to normal operation by applying a restoring force 214. Once in approximately the normal configuration, the resilient members 606 and the flexible wall 608, and the strip(s) 106 enclosed within the flexible section 204 reassert their previous physical configuration. Once reasserted, the mast 104 may resume normal operation.

In some implementations the resilient members 606 may be omitted. For example, the walls of the flexible section 204 may be sufficiently flexible and resilient to maintain their shape under a desired load while still non-destructively buckling when that desired load is exceeded.

One or more keying features may be present to allow for orientation of the mast 104 to be maintained with respect to the chassis 110. For example, a keying feature such as a longitudinal ridge may extend from a portion of the flexible wall 608. A corresponding other telescoping section 130 may include a longitudinal trough to receive the longitudinal ridge, and allow longitudinal movement while preventing rotation of the telescoping sections 130.

The flexible section 204 may be used in conjunction with other techniques to provide the force that extends the mast 104, instead of or in addition to the strip 106. For example, the telescoping sections 130 may be extended by using pneumatic or hydraulic force. In such implementations, the flexible section 204 may be designed to collapse as described above under the influence of an impact force 206, and still be able to recover to substantially the same shape after application of a restoring force 214.

In other implementations other cross-sectional shapes may be used. For example, the telescoping sections 130 may have cross sections that are triangular, rectangular, curved, ellipsoidal, and so forth.

Figure 7:
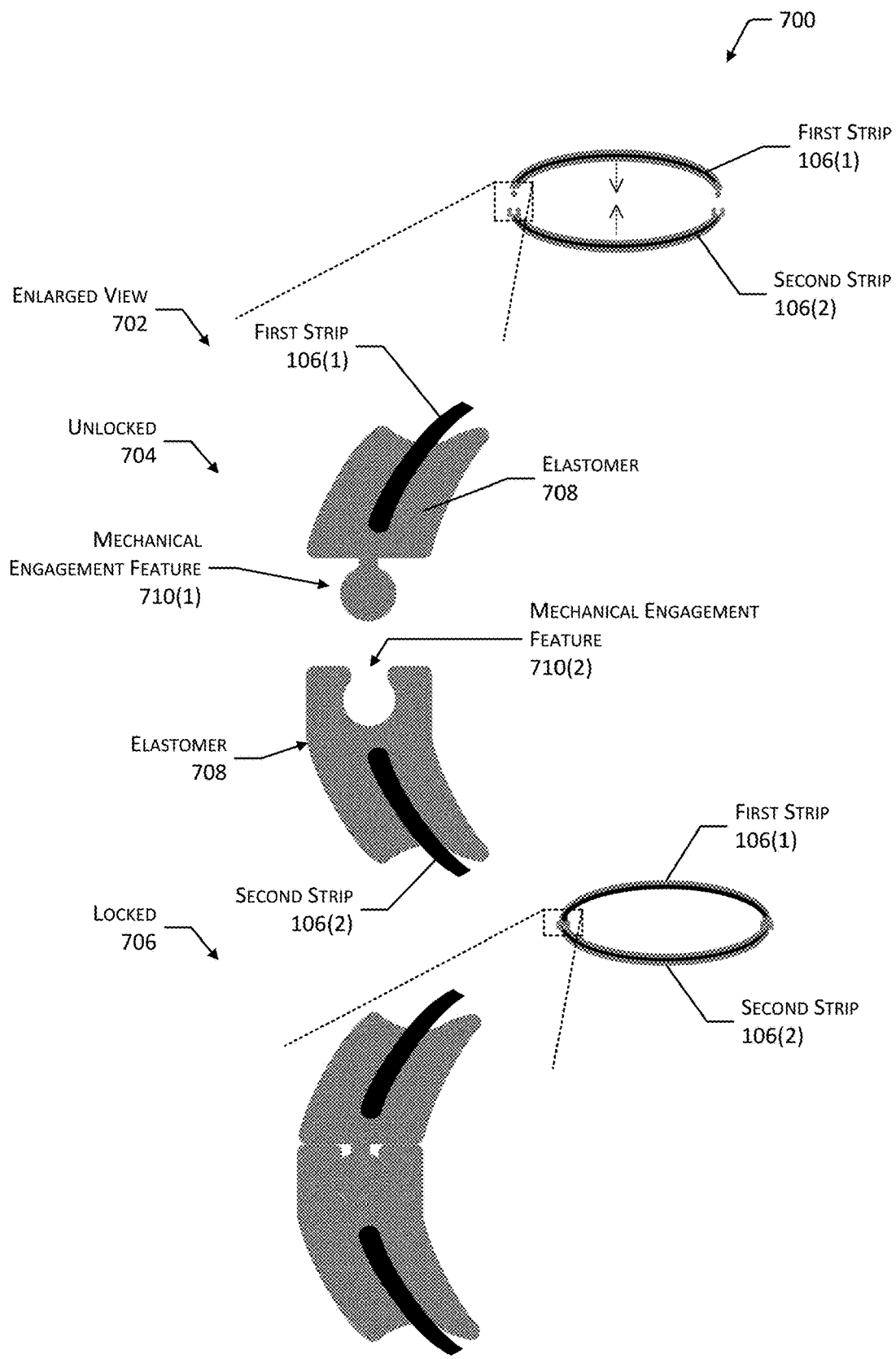
FIG. 7 illustrates enlarged top views of a two strip configuration with elastomeric mechanical engagement features in unlocked and locked configurations, according to some implementations.

FIG. 7 illustrates views 700 of a two-strip configuration with elastomeric mechanical engagement features that can join the two strips 106 when extended, according to some implementations.

Similar to the arrangement depicted above with regard to FIG. 4, a first strip 106(1) and a second strip 106(2) may be arranged so that their respective inner surfaces 306 are facing each other. In some situations, it may be advantages to temporarily join the first strip 106(1) and the second strip 106(2) into a single structure while extended.

An enlarged view 702 depicts the first strip 106(1) and the second strip 106(2) in an unlocked 704 and a locked 706 configuration.

The strips 106 may include an additional elastomeric material, such as an overmolded covering. As depicted in the unlocked 704 configuration, the first strip 106(1) is enclosed within an elastomer 708. For example, the elastomer 708 may comprise silicone rubber. Formed onto the long edges 308 of the strips 106 are mechanical engagement features 710. For example, the mechanical engagement features 710(1) on the long edges 308 of the first strip 106(1) may comprise a rib. Continuing the example, the mechanical engagement features 710(2) on the long edges 308 of the second strip 106(2) may comprise a notch.

During extension of the mast 104, the mechanical engagement features 710 for the first strip 106(1) and the second strip 106(2) are mated together. A joining mechanism may comprise one or more inclined planes, rollers, clamps, cams, or other devices that force the mechanical engagement features 710 together. For example, the force provided by the one or more actuators 118 may drive the first strip 106(1) and the second strip 106(2) into a confined channel that forces the ribs of the first strip 106(1) into the notch of the second strip 106(2).

The locked 706 configuration depicts the two long edges 308 of the first strip 106(1) and the second strip 106(2) that are now joined together. The locked first strip 106(1) and the second strip 106(2) may provide increased load capability, stability, resistance to lateral or vertical forces, and so forth.

Instead of, or in addition to, the elastomeric materials, other materials may be used to form one or more of the mechanical engagement features 710. For example, the mechanical engagement features 710 may comprise nylon.

In other implementations, other techniques may be used to join the first strip 106(1) to the second strip 106(2). For example, magnets, magnetized vinyl, ferromagnetic materials, and so forth may be arranged along the long edges 308 of the strips 106. Continuing the example, magnets with opposite polarities may be arranged on the respective strips 106, such that when deployed the magnets are attracted to one another, holding the long edge 308 of the first strip 106(1) to the corresponding long edge 308 of the second strip 106(2).

Figure 8:
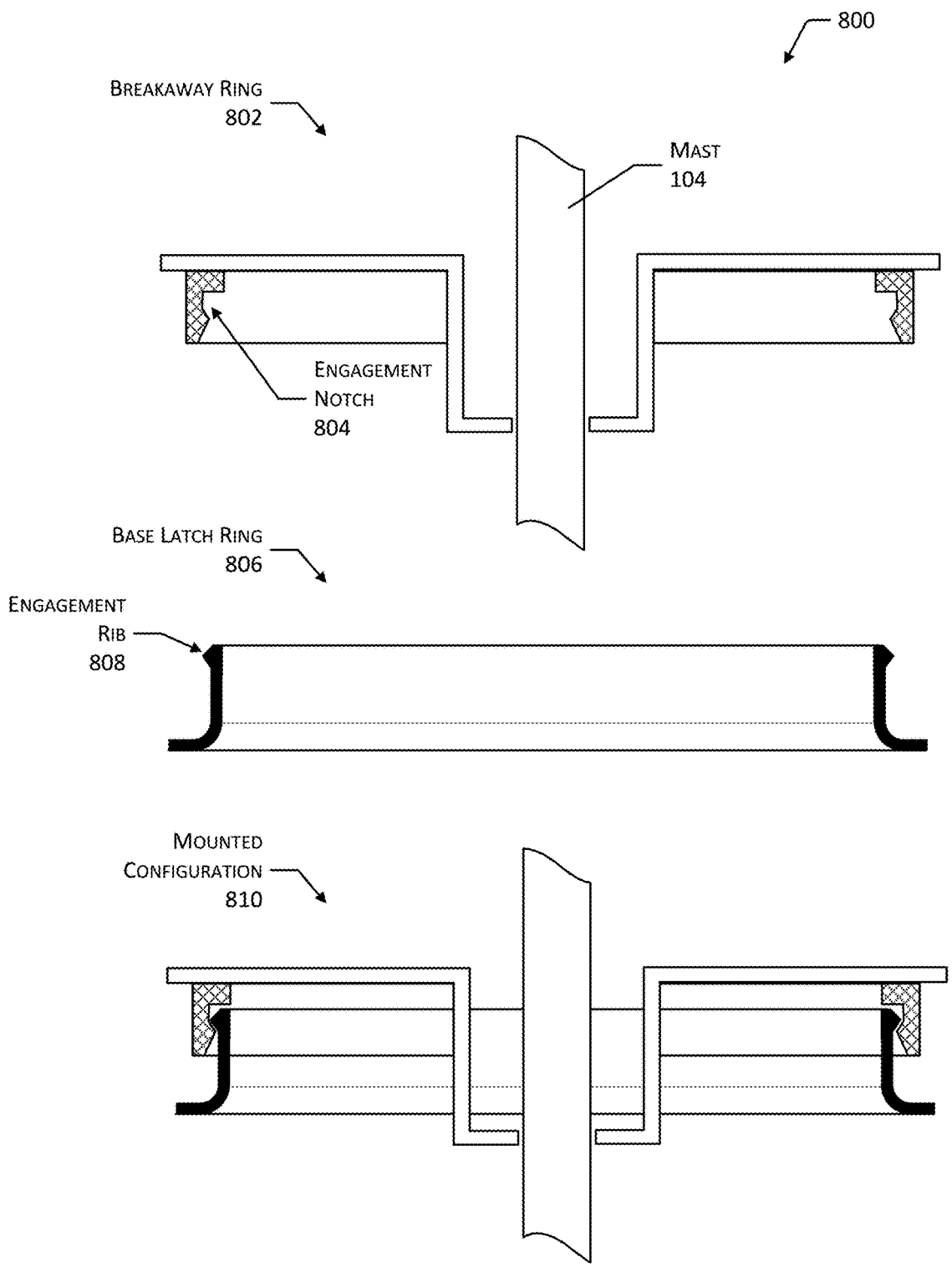
FIG. 8 illustrates views of a breakaway fitting that can decouple the mast from the chassis in the event of a significant lateral force, according to one implementation.

FIG. 8 illustrates views 800 of the breakaway fitting 134 that can decouple the mast 104 from the chassis 110 in the event of a significant lateral force that exceeds a threshold value, according to one implementation. For example, a lateral impact on a rigid telescoping section 130 that extends above the outer edge of the chassis 110 may result in the operation of the breakaway fitting 134 separating the mast 104 from the chassis 110.

The breakaway fitting 134 may include a breakaway ring 802. The mast 104 passes through the breakaway ring 802. In some implementations the breakaway ring 802 may be affixed to the mast 104. For example, the mast 104 may be welded or glued to the breakaway ring 802. The breakaway ring 802 has an annular body, with one or more circumferential engagement notches 804.

A base latch ring 806 comprises an annular body, with one or more engagement ribs 808 extended along an upper portion of the base latch ring 806. The base latch ring 806 is affixed to, or part of, the chassis 110 or other structure.

A mounted configuration 810 depicts the breakaway ring 802 as coupled to the base latch ring 806. The engagement notches 804 of the breakaway ring 802 are configured to mechanically engage the corresponding engagement rib 808 that protrudes from the base latch ring 806.

The threshold value of force needed to decouple the breakaway ring 802 from the base latch ring 806 may be determined by the relative size, shape, composition, placement, and so forth of the engagement notch 804 and the engagement rib 808.

In the mounted configuration 810, the mechanical force between the one or more engagement notches 804 and the one or more engagement ribs 808 maintains the mast 104 in the operating position. In the event of a lateral force that exceeds the holding force provided between the one or more engagement notches 804 and the one or more engagement ribs 808, the breakaway ring 802 separates from the base latch ring 806. After the event, the breakaway ring 802 may be snapped back into place, and normal operation resumed.

In other implementations, magnets may be used instead of, or in addition to, the mechanical engagement features described above. For example, rare earth magnets may be used to retain the breakaway ring 802 to the base latch ring 806. A first magnet may be affixed to a portion of a breakaway ring 802 while a second magnet may be affixed to a portion of the base latch ring 806. In other implementations, a magnet may be used on one portion of the breakaway fitting 134 and may be attracted to a piece of non-magnetic ferrous material on another portion of the breakaway fitting 134.

The particular arrangement of first magnet and second magnet may be used to provide indexing, resulting in a predetermined alignment of the mast 104. For example, a first half of the perimeter of the breakaway ring 802 may use magnets with their north poles facing the base latch ring 806, while a second half uses magnets with their south poles facing the base latch ring 806. The base latch ring 806 may then have a complementary arrangement of magnets, such that a first half of the perimeter of the base latch ring 806 uses magnets with their south poles facing the breakaway ring 802 while the second half uses magnets with their north poles facing the breakaway ring 802. When installed in the proper alignment or indexing, the breakaway ring 802 is attracted to the base latch ring 806. However, an incorrect alignment would result in a repulsion between the two if grossly misaligned, or would self correct a minor misalignment by pulling the breakaway ring 802 and the base latch ring 806 into the desired configuration.

The breakaway fitting improves the safety of the device while also reducing or eliminating damage in the event of a collision between an object and the mast 104. As a result, operation of the device is improved.

Figure 9:
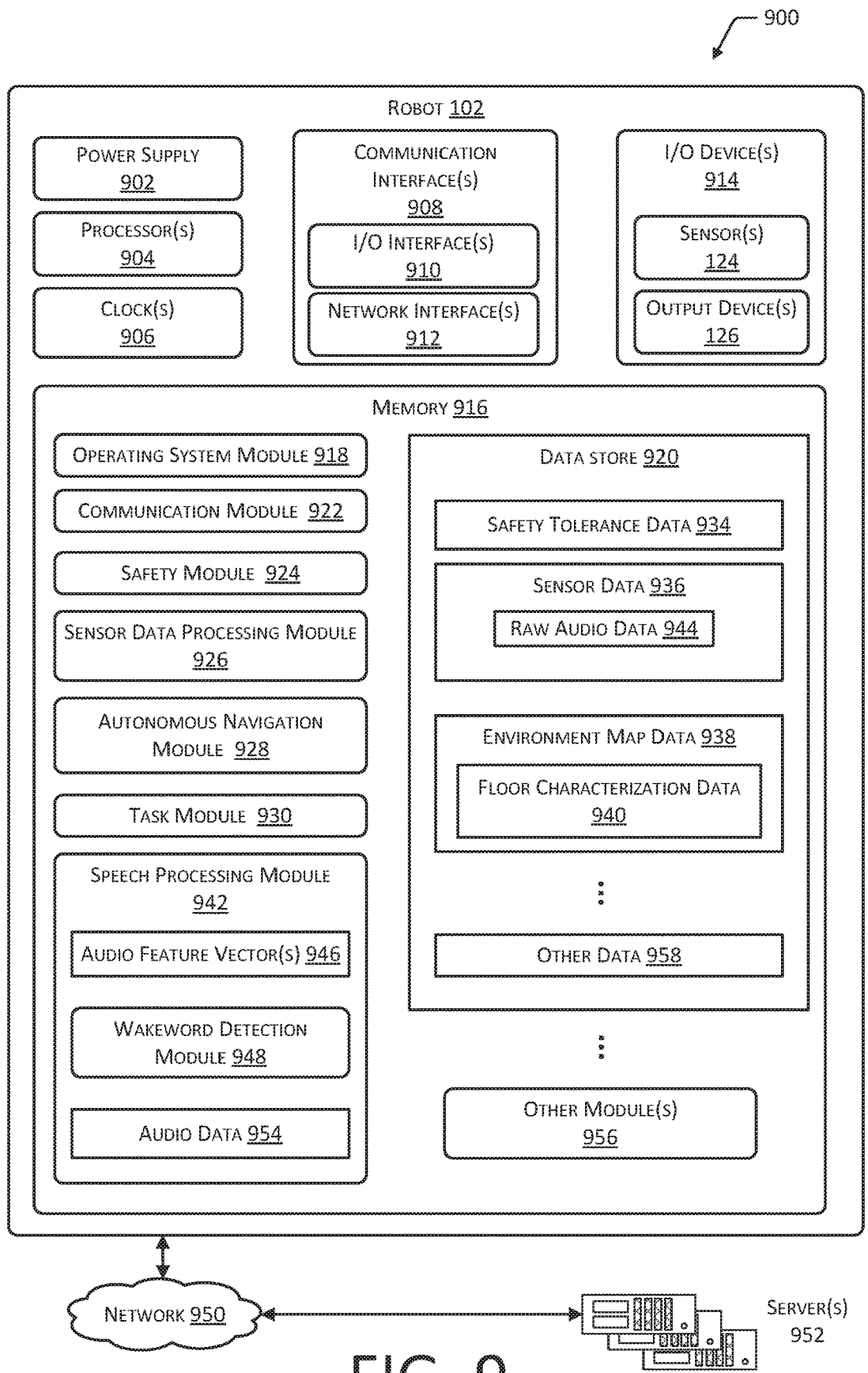
FIG. 9 is a block diagram of the components of the robot, according to some implementations.

FIG. 9 is a block diagram 900 of the robot 102, according to some implementations.

The robot 102 may include one or more power supplies 902 to provide electrical power suitable for operating the components in the robot 102. The one or more power supplies 902 may comprise batteries, capacitors, fuel cells, photovoltaic cells, wireless power receivers, wireless power receivers, conductive couplings suitable for attachment to an external power source such as provided by an electric utility, and so forth. The robot 102 may implement multiple separate power supplies 902. For example, a first power supply 902 may be used to provide electrical power to one or more motors of the robot 102 while a second power supply 902 is used to provide electrical power to other electronics such as processors 904, communication interfaces 908, sensors 124, and so forth.

The robot 102 may include one or more hardware processors 904 (processors) configured to execute one or more stored instructions. The processors 904 may comprise one or more cores. The processors 904 may include microcontrollers, systems on a chip, field programmable gate arrays, digital signals processors, graphic processing units, general processing units, and so forth. One or more clocks 906 may provide information indicative of date, time, ticks, and so forth. For example, the processor 904 may use data from the clock 906 to associate a particular interaction with a particular point in time.

The robot 102 may include one or more communication interfaces 908 such as input/output (I/O) interfaces 910, network interfaces 912, and so forth. The communication interfaces 908 enable the robot 102, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 124, keyboard, mouse, scanner, and so forth. The I/O devices 914 may also include output devices 126 such as one or more of a motor, light, speaker, display, projector, printer, and so forth. In some embodiments, the I/O devices 914 may be physically incorporated with the robot 102 or may be externally placed.

The I/O devices 914 may also include the actuator control electronics 116. For example, the actuator control electronics 116 may be directed to extend or retract the mast 104 to place the sensors 124 or output devices 126 on the mast 104 at a particular height.

The network interfaces 912 may be configured to provide communications between the robot 102 and other devices such as other robots 102, a docking station, routers, access points, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, Bluetooth Low Energy, ZigBee, and so forth.

The robot 102 may also include one or more busses or other internal communications hardware or software that allow for the transfer of data between the various modules and components of the robot 102.

As shown in FIG. 9, the robot 102 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the robot 102. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including other robots 102, servers, network attached storage devices, and so forth.

A communication module 922 may be configured to establish communication with other devices, such as other robots 102, an external server, a docking station, and so forth. The communications may be authenticated, encrypted, and so forth.

Other modules within the memory 916 may include a safety module 924, a sensor data processing module 926, an autonomous navigation module 928, task module 930, or other modules 956. The modules may access data stored within the data store 920, such as safety tolerance data 934, sensor data 936, environment map data 938, floor characterization data 940, or other data 958.

The safety module 924 may access safety tolerance data 934 to determine within what tolerances the robot 102 may operate safely within the environment. For example, the safety module 924 may be configured to stop the robot 102 from moving when a carrying handle is extended. In another example, the safety tolerance data 934 may specify a minimum sound threshold which, when exceeded, stops all movement of the robot 102. Continuing this example, detection of sound such as a human yell would stop the robot 102. In another example, the safety module 924 may access safety tolerance data 934 that specifies a minimum distance from an object that the robot 102 may maintain. Continuing this example, if a sensor 124 detects an object that approaches at less than the minimum distance, all movement of the robot 102 may be stopped. Movement of the robot 102 may be stopped by one or more of inhibiting operation of one or more of the motors, issuing a command to stop motor operation, disconnecting power from one or more of the motors, and so forth. The safety module 924 may be implemented as hardware, software, or a combination thereof.

The safety module 924 may control other factors, such as a maximum speed of the robot 102 based on information obtained by the sensors 124, precision and accuracy of the sensor data 936, and so forth. For example, detection of an object by an optical sensor may include some error, such as when the distance to an object comprises a weighted average between an object and a background. As a result, the maximum speed permitted by the safety module 924 may be based on one or more factors such as the weight of the robot 102, nature of the floor, distance to object, and so forth.

The sensor data processing module 926 may access sensor data 936 that is acquired from one or more the sensors 124. The sensor data processing module 926 may provide various processing functions such as de-noising, filtering, change detection, and so forth. Processing of sensor data 936, such as images from a camera sensor 124, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 936. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 936 or other data. For example, the ANN may be trained using a supervised learning algorithm such that object identifiers are associated with images of particular objects within training images provided to the ANN. Once trained, the ANN may be provided with the sensor data 936 and produce output indicative of the object identifier.

The autonomous navigation module 928 provides the robot 102 with the ability to navigate within the environment without real-time human interaction. For example, the autonomous navigation module 928 may implement one or more simultaneous localization and mapping ("SLAM") techniques to determine the presence of obstacles, walls, landmarks, and so forth. The SLAM algorithms may utilize one or more of maps, algorithms, beacons, or other techniques to provide navigational data. The navigational data may then be used to determine a path which is then subsequently used to determine a set of commands that drive motors connected to wheels. For example, the autonomous navigation module 928 may access environment map data 938 during operation to determine relative location, estimate a path to a destination, and so forth.

The autonomous navigation module 928 may utilize various techniques during processing of sensor data 936. For example, image data obtained from cameras may be processed to determine one or more of corners, edges, planes, and so forth. In some implementations, corners may be detected and the coordinates of those corners may be used to produce point cloud data.

The environment map data 938 may be manually or automatically determined. Continuing the example, during the learning phase, or subsequent operation, the robot 102 may generate environment map data 938 that is indicative of locations of objects and structures such as chairs, doors, and so forth.

In some implementations, the environment map data 938 may include floor characterization data 940. The floor characterization data 940 is indicative of one or more attributes of the floor at a particular location within the environment.

The autonomous navigation module 928 may be used to move the robot 102 from a first location to a second location within the environment. This movement may be responsive to a determination made by an onboard processor 904, in response to a command received via one or more communication interfaces 908 or a sensor 124, and so forth. For example, an external server 952 may send a command that is subsequently received using a network interface 912. This command may direct the robot 102 to proceed to a designated destination, such as "living room" or "dining room". The robot 102 may then process this command, and use the autonomous navigation module 928 to determine the directions and distances associated with reaching the specified destination.

The memory 916 may store one or more task modules 930. A task module 930 comprises instructions that, when executed, provide one or more functions associated with a particular task. In one example, the task may comprise a security or watchmen task in which the robot 102 travels throughout the environment looking for events that exceed predetermined thresholds. Continuing the example, if the robot 102 detects that the ambient temperature is below a minimum level, or that water is present on the floor, or detects the sound of broken glass, an alert may be generated. The alert may be given as an audible, visual, or electronic notification. For example, the electronic notification may involve the robot 102 transmitting data using one or more communication interfaces 908.

In another example, the task may comprise a "follow me" feature in which the robot 102 follows a user. For example, the user may participate in a video call using the robot 102. The camera on the mast 104 may be used to acquire video for transmission while the display 1072 is used to present video that is received. The robot 102 may use data from one or more sensors 124 to determine a location of the user relative to the robot 102, and track and follow the user. In one implementation, computer vision techniques may be used to locate the user within image data acquired by the cameras. In another implementation, the user's voice may be detected by an array of microphones, and a direction to the voice with respect to the robot 102 may be established. Other techniques may be utilized either alone or in combination to allow the robot 102 to track a user, follow a user, or track and follow a user.

In yet another example, the task may allow for the robot 102 to be summoned to a particular location. The user may utter a voice command that is heard by a microphone on the robot 102, a microphone in a smart phone, or another device with a microphone such as a network enabled speaker or television. Alternatively, the user may issue a command using an app on a smartphone, wearable device, tablet, or other computing device. Given that the location of the device at which the command was obtained is known, the robot 102 may be dispatched to that location. Alternatively, if the location is unknown, the robot 102 may search for the user.

A speech processing module 942 may be used to process utterances of the user. Microphones 1046 may acquire audio in the presence of the robot 102 and may send raw audio data 944 to an acoustic front end (AFE). The AFE may transform the raw audio data 944 (for example, a single-channel, 16-bit audio stream sampled at 16 kHz), captured by the microphone 1046, into audio feature vectors 946 that may ultimately be used for processing by various components, such as a wakeword detection module 948, speech recognition engine, or other components. The AFE may reduce noise in the raw audio data 944. The AFE may also perform acoustic echo cancellation (AEC) or other operations to account for output audio data that may be sent to a speaker of the robot 102 for output. For example, the robot 102 may be playing music or other audio that is being received from a network 950 in the form of output audio data. To prevent the output audio interfering with the device's ability to detect and process input audio, the AFE or other component may perform echo cancellation to remove the output audio data from the input raw audio data 944, or other operations.

The AFE may divide the audio data into frames representing time intervals for which the AFE determines a number of values (i.e., features) representing qualities of the raw audio data 944, along with a set of those values (i.e., a feature vector or audio feature vector) representing features/qualities of the raw audio data 944 within each frame. A frame may be a certain period of time, for example a sliding window of 95 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 944, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 946 (or the raw audio data 944) may be input into a wakeword detection module 948 that is configured to detect keywords spoken in the audio. The wakeword detection module 948 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 102 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 102 (or separately from speech detection), the robot 102 may use the wakeword detection module 948 to perform wakeword detection to determine when a user intends to speak a command to the robot 102. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 948 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 102 may "wake" and begin transmitting audio data 954 (which may include one or more audio feature vectors 946 or the raw audio data 944) to one or more server(s) 952 for speech processing. The audio data 954 corresponding to audio obtained by the microphone 1046 may be sent to a server 952 for routing to a recipient device or may be sent to the server for speech processing for interpretation of the included speech (either for purposes of enabling voice-communications and/or for purposes of executing a command in the speech). The audio data 954 may include data corresponding to the wakeword, or the portion of the audio data corresponding to the wakeword may be removed by the local robot 102 prior to sending.

The robot 102 may connect to the network 950 using one or more of the network interfaces 912. One or more servers 952 may provide various functions, such as ASR, natural language understanding (NLU), providing content such as audio or video to the robot 102, and so forth.

The other modules 956 may provide other functionality, such as object recognition, speech recognition, speech synthesis, and so forth. For example, an ASR module may accept as input raw audio data 944 or audio feature vectors 946 and may produce as output a text string that is further processed and used to provide input, initiate operation of a task module 930, and so forth. In one implementation, the text string may be sent to the server 952 for further processing. The robot 102 may receive a response from the server 952 and present output, perform an action, and so forth. For example, the raw audio data 944 may include the user saying "robot go to the dining room". The audio data 954 representative of this utterance may be sent to the server 952 that returns commands directing the robot 102 to the dining room of the home associated with the robot 102.

The utterance may result in a response from the server 952 that directs operation of other devices or services. For example, the user may say "robot wake me at seven tomorrow morning". The audio data 954 may be sent to the server 952 that determines the intent and generates commands to instruct a device attached to the network 950 to play an alarm at 7:00 am the next day.

In another example, the other modules 956 may comprise a speech synthesis module that is able to convert text data to human speech.

Figure 10:
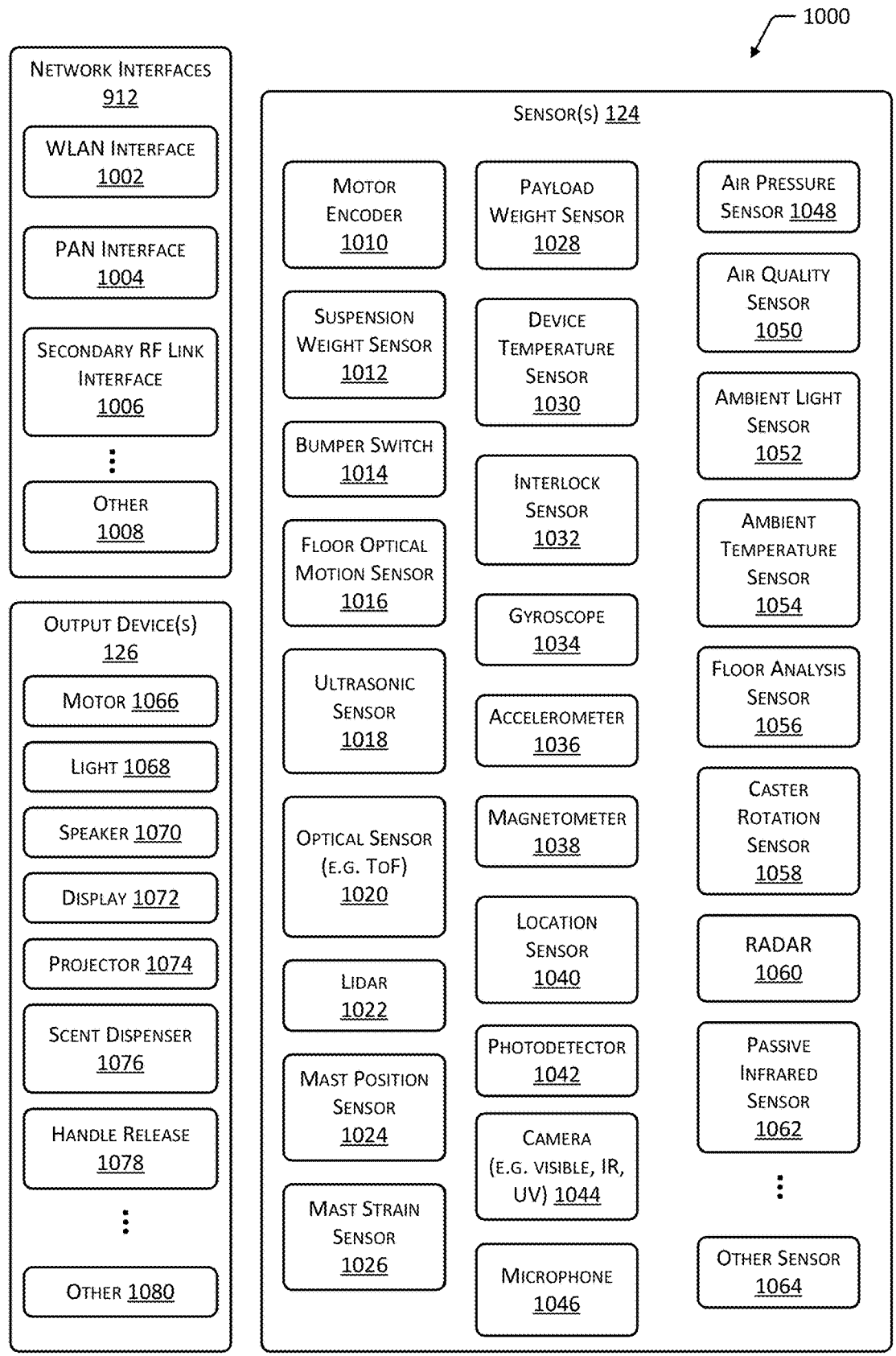
FIG. 10 is a block diagram of some components of the robot such as network interfaces, sensors, and output devices, according to some implementations.

FIG. 10 is a block diagram 1000 of some components of the robot 102 such as network interfaces 912, sensors 124, and output devices 126, according to some implementations. The components illustrated here are provided by way of illustration and not necessarily as a limitation. For example, the robot 102 may utilize a subset of the particular network interfaces 912, output devices 126, or sensors 124 depicted here, or may utilize components not pictured.

The network interfaces 912 may include one or more of a WLAN interface 1002, PAN interface 1004, secondary radio frequency (RF) link interface 1006, or other interface 1008. The WLAN interface 1002 may be compliant with at least a portion of the Wi-Fi specification. For example, the WLAN interface 1002 may be compliant with at least a portion of the IEEE 802.11 specification as promulgated by the Institute of Electrical and Electronics Engineers (IEEE). The PAN interface 1004 may be compliant with at least a portion of one or more of the Bluetooth, wireless USB, Z-Wave, ZigBee, or other standards. For example, the PAN interface 1004 may be compliant with the Bluetooth Low Energy (BLE) specification.

The secondary RF link interface 1006 may comprise a radio transmitter and receiver that operate at frequencies different from or using modulation different from the other interfaces. For example, the WLAN interface 1002 may utilize frequencies in the 2.4 GHz and 5 GHz Industrial Scientific and Medicine (ISM) bands, while the PAN interface 1004 may utilize the 2.4 GHz ISM bands. The secondary RF link 1006 may comprise a radio transmitter that operates in the 900 MHz ISM band, within a licensed band at another frequency, and so forth. The secondary RF link interface 1006 may be utilized to provide backup communication between the robot 102 and other devices in the event that communication fails using one or more of the WLAN interface 1002 or the PAN interface 1004. For example, in the event the robot 102 travels to an area within the environment that does not have Wi-Fi coverage, the robot 102 may use the secondary RF link interface 1006 to communicate with another device such as a specialized access point, docking station, or other robot 102.

The other 1008 network interfaces may include other equipment to send or receive data using other wavelengths or phenomena. For example, the other 1008 network interface may include an ultrasonic transceiver used to send data as ultrasonic sounds, a visible light system that communicates by modulating a visible light source such as a light-emitting diode, and so forth. In another example, the other 1008 network interface may comprise a wireless wide area network (WWAN) interface or a wireless cellular data network interface. Continuing the example, the other 1008 network interface may be compliant with at least a portion of the 3G, 4G, LTE, or other standards.

The robot 102 may include one or more of the following sensors 124. The sensors 124 depicted here are provided by way of illustration and not necessarily as a limitation. It is understood that other sensors 124 may be included or utilized by the robot 102, while some sensors 124 may be omitted in some configurations.

A motor encoder 1010 provides information indicative of the rotation or linear extension of a motor. The motor may comprise a rotary motor, or a linear actuator. In some implementations, the motor encoder 1010 may comprise a separate assembly such as a photodiode and encoder wheel that is affixed to the motor. In other implementations, the motor encoder 1010 may comprise circuitry configured to drive the motor. For example, the autonomous navigation module 928 may utilize the data from the motor encoder 1010 to estimate a distance traveled.

In another implementation, a motor encoder 1010 may provide information about the amount of strip 106 that has been extended or retracted by the actuator 118.

A suspension weight sensor 1012 provides information indicative of the weight of the robot 102 on the suspension system for one or more of the wheels or the caster. For example, the suspension weight sensor 1012 may comprise a switch, strain gauge, load cell, photodetector, or other sensing element that is used to determine whether weight is applied to a particular wheel, or whether weight has been removed from the wheel. In some implementations, the suspension weight sensor 1012 may provide binary data such as a "1" value indicating that there is a weight applied to the wheel, while a "0" value indicates that there is no weight applied to the wheel. In other implementations, the suspension weight sensor 1012 may provide an indication such as how many kilograms of force or newtons of force are applied. The suspension weight sensor 1012 may be affixed to one or more of the wheels or the caster. In some situations, the safety module 924 may use data from the suspension weight sensor 1012 to determine whether or not to inhibit operation of one or more of the motors. For example, if the suspension weight sensor 1012 indicates no weight on the suspension, the implication is that the robot 102 is no longer resting on its wheels, and thus operation of the motors may be inhibited. In another example, if the suspension weight sensor 1012 indicates weight that exceeds a threshold value, the implication is that something heavy is resting on the robot 102 and thus operation of the motors may be inhibited.

One or more bumper switches 1014 provide an indication of physical contact between a bumper or other member that is in mechanical contact with the bumper switch 1014. The safety module 924 utilizes sensor data 936 obtained by the bumper switches 1014 to modify the operation of the robot 102. For example, if the bumper switch 1014 associated with a front of the robot 102 is triggered, the safety module 924 may drive the robot 102 backwards.

A floor optical motion sensor (FOMS) 1016 provides information indicative of motions of the robot 102 relative to the floor or other surface underneath the robot 102. In one implementation, the FOMS 1016 may comprise a light source such as a light-emitting diode (LED), an array of photodiodes, and so forth. In some implementations, the FOMS 1016 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 1016 may provide other information, such as data indicative of a pattern present on the floor, composition of the floor, color of the floor, and so forth. For example, the FOMS 1016 may utilize an optoelectronic sensor that may detect different colors or shades of gray, and this data may be used to generate floor characterization data 940.

An ultrasonic sensor 1018 utilizes sounds in excess of 90 KHz to determine a distance from the sensor 124 to an object. The ultrasonic sensor 1018 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1018 may provide information indicative of a presence of an object, distance to the object, and so forth. Two or more ultrasonic touch sensors 1018 may be utilized in conjunction with one another to determine a location within a two-dimensional plane of the object.

In some implementations, the ultrasonic sensor 1018 or portion thereof may be used to provide other functionality. For example, the emitter of the ultrasonic sensor 1018 may be used to transmit data and the detector may be used to receive data transmitted that is ultrasonic sound. In another example, the emitter of an ultrasonic sensor 1018 may be set to a particular frequency and used to generate a particular waveform such as a sawtooth pattern to provide a signal that is audible to an animal, such as a dog or a cat.

An optical sensor 1020 may provide sensor data indicative of one or more of a presence or absence of an object, a distance to the object, or characteristics of the object. The optical sensor 1020 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1020 may utilize one or more sensing elements. For example, the optical sensor 1020 may comprise a 4×4 array of light sensing elements. Each individual sensing element may be associated with a field of view (FOV) that is directed in a different way. For example, the optical sensor 1020 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 1044. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1020 may operate as a depth camera, providing a two-dimensional image of a scene, as well as data that indicates a distance to each pixel.

Data from the optical sensors 1020 may be utilized for collision avoidance. For example, the safety module 924 and the autonomous navigation module 928 may utilize the sensor data 936 indicative of the distance to an object in order to prevent a collision with that object.

Multiple optical sensors 1020 may be operated such that their FOV overlap at least partially. To minimize or eliminate interference, the optical sensors 1020 may selectively control one or more of the timing, modulation, or frequency of the light emitted. For example, a first optical sensor 1020 may emit light modulated at 102 kHz while a second optical sensor 1020 emits light modulated at 103 kHz.

A lidar 1022 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 936 may be generated that is indicative of the presence of objects and the relative positions, shapes, and so forth are visible to the lidar 1022. Data from the lidar 1022 may be used by various modules. For example, the autonomous navigation module 928 may utilize point cloud data generated by the lidar 1022 for localization of the robot 102 within the environment.

A mast position sensor 1024 provides information indicative of a position of the mast 104. For example, the mast position sensor 1024 may comprise limit switches associated with the telescoping sections 130 that indicate whether the mast 104 is an extended or retracted position. In other implementations, the mast position sensor 1024 may use an optical code on at least a portion of the mast 104 or the strip 106 therein that is then interrogated by an optical emitter and a photodetector to determine the distance to which the mast 104 is extended. In another implementation, the mast position sensor 1024 may comprise an encoder wheel that is attached to a mast motor that is used to raise or lower the mast 104.

The mast position sensor 1024 may provide data to the safety module 924. For example, if the robot 102 is preparing to deploy the carrying handle, data from the mast position sensor 1024 may be checked to determine if the mast 104 is retracted, and if not, the mast 104 may be retracted prior to deployment of the carrying handle. By retracting the mast 104 before the carrying handle is deployed, injury to the user as well as damage to the mast 104 is avoided as the user bends down to grasp the carrying handle.

A mast strain sensor 1026 provides information indicative of a strain on the mast 104 with respect to the remainder of the robot 102. For example, the mast strain sensor 1026 may comprise a strain gauge or load cell that measures a side load as applied to the mast 104 or a weight on the mast 104 or downward pressure on the mast 104. In another example, one or more of the strips 106 or the flexible section(s) 204 may include strain gauges that indicate if the strips 106 or the flexible section(s) 204 have buckled.

The safety module 924 may utilize sensor data 936 obtained by the mast strain sensor 1026. For example, if the strain applied to the mast 104 exceeds a threshold amount, the safety module 924 may direct an audible and visible alarm to be presented by the robot 102.

A payload weight sensor 1028 provides information indicative of the weight associated with the modular payload bay. The payload weight sensor 1028 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1028 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1028 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 924 may utilize the payload weight sensor 1028 to determine if the modular payload bay has been overloaded. If so, an alert or notification may be issued.

One or more device temperature sensors 1030 may be utilized by the robot 102. The device temperature sensors 1030 provide temperature data of one or more components within the robot 102. For example, a device temperature sensor 1030 may indicate a temperature of one or more batteries, one or more motors, and so forth. In the event the temperature exceeds a threshold value, the component associated with that device temperature sensor 1030 may be shut down.

One or more interlock sensors 1032 may provide data to the safety module 924 or other circuitry that prevents the robot 102 from operating in an unsafe condition. For example, the interlock sensors 1032 may comprise switches that indicate whether an access panel is open, if the carrying handle is deployed, if the breakaway fitting 134 has separated, if the mast 104 has collapsed, and so forth. The interlock sensors 1032 may be configured to inhibit operation of the robot 102 until the interlock switch indicates a safe condition is present.

A gyroscope 1034 may provide information indicative of rotation of an object affixed thereto. For example, the gyroscope 1034 may generate sensor data 936 that is indicative of a change in orientation of the robot 102 or portion thereof.

An accelerometer 1036 provides information indicative of a direction and magnitude of an imposed acceleration. Data such as rate of change, determination of changes in direction, speed, and so forth may be determined using the accelerometer 1036. The accelerometer 1036 may comprise mechanical, optical, micro-electromechanical, or another device. For example, the gyroscope 1034 in the accelerometer 1036 may comprise a prepackaged solid-state inertial measurement unit (IMU) that provides for multiple axis gyroscopes 1034 and accelerometers 1036.

A magnetometer 1038 may be used to determine an orientation by measuring ambient magnetic fields, such as the terrestrial magnetic field. For example, the magnetometer 1038 may comprise a Hall effect transistor that provides as output compass data indicative of a magnetic heading.

The robot 102 may include one or more location sensors 1040. The location sensors 1040 may comprise an optical, radio, or other navigational system such as a global positioning system (GPS) receiver. For indoor operation, the location sensors 1040 may comprise indoor position systems, such as using Wi-Fi Positioning Systems (WPS). The location sensors 1040 may provide information indicative of a relative location, such as "living room" or an absolute location such as particular coordinates indicative of latitude and longitude, or displacement with respect to a predefined origin.

A photodetector 1042 provides sensor data 936 indicative of impinging light. For example, the photodetector 1042 may provide data indicative of a color, intensity, duration, and so forth.

A camera 1044 generates sensor data 936 indicative of one or more images. The camera 1044 may be configured to detect light in one or more wavelengths including, but not limited to, terahertz, infrared, visible, ultraviolet, and so forth. For example, an infrared camera 1044 may be sensitive to wavelengths between approximately 700 nanometers and 1 millimeter. The camera 1044 may comprise charge coupled devices (CCD), complementary metal oxide semiconductor (CMOS) devices, microbolometers, and so forth. The robot 102 may use image data acquired by the camera 1044 for object recognition, navigation, collision avoidance, user communication, and so forth. For example, a pair of cameras 1044 sensitive to infrared light may be mounted on the front of the robot 102 to provide binocular stereo vision, with the sensor data 936 comprising images being sent to the autonomous navigation module 928. In another example, the camera 1044 may comprise a 10 megapixel or greater camera that is used for videoconferencing or for acquiring pictures for the user.

The camera 1044 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 1044, particularly those associated with navigation or autonomous operation, may utilize a global shutter. In other implementations, the camera(s) 1044 providing images for use by the autonomous navigation module 928 may be acquired using a rolling shutter and subsequently may be processed to mitigate image artifacts.

One or more microphones 1046 may be configured to acquire information indicative of sound present in the environment. In some implementations, arrays of microphones 1046 may be used. These arrays may implement beamforming techniques to provide for directionality of gain. The robot 102 may use the one or more microphones 1046 to acquire information from acoustic tags, accept voice input from users, determine ambient noise level, for voice communication with another user or system, and so forth.

An air pressure sensor 1048 may provide information indicative of an ambient atmospheric pressure or changes in ambient atmospheric pressure. For example, the air pressure sensor 1048 may provide information indicative of changes in air pressure due to opening and closing of doors, weather events, and so forth.

An air quality sensor 1050 may provide information indicative of one or more attributes of the ambient atmosphere. For example, the air quality sensor 1050 may include one or more chemical sensing elements to detect the presence of carbon monoxide, carbon dioxide, ozone, and so forth. In another example, the air quality sensor 1050 may comprise one or more elements to detect particulate matter in the air, such as the photoelectric detector, ionization chamber, and so forth. In another example, the air quality sensor 1050 may include a hygrometer that provides information indicative of relative humidity.

An ambient light sensor 1052 may comprise one or more photodetectors or other light-sensitive elements that are used to determine one or more of the color, intensity, duration of ambient lighting around the robot 102.

An ambient temperature sensor 1054 provides information indicative of the temperature of the ambient environment proximate to the robot 102. In some implementations, an infrared temperature sensor may be utilized to determine the temperature of another object at a distance.

A floor analysis sensor 1056 may include one or more components that are used to generate at least a portion of the floor characterization data 940. In one implementation, the floor analysis sensor 1056 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1056 may be used by one or more of the safety module 924, the autonomous navigation module 928, the task module 930, and so forth. For example, if the floor analysis sensor 1056 determines that the floor is wet, the safety module 924 may decrease the speed of the robot 102 and generate a notification alerting the user.

The floor analysis sensor 1056 may include other components as well. For example, a coefficient of friction sensor may comprise a probe that comes into contact with the surface and determines the coefficient of friction between the probe and the floor.

A caster rotation sensor 1058 provides data indicative of one or more of a direction of orientation, angular velocity, linear speed of the caster, and so forth. For example, the caster rotation sensor 1058 may comprise an optical encoder and corresponding target that is able to determine that the caster transitioned from an angle of 0° at a first time to 49° at a second time.

The sensors 124 may include a radar 1060. The radar 1060 may be used to provide information as to a distance, lateral position, and so forth, to an object.

The sensors 124 may include a passive infrared (PIR) sensor 1062. The PIR 1062 may be used to detect the presence of people, pets, hotspots, and so forth. For example, the PIR 1062 may be configured to detect infrared radiation with wavelengths between 8 and 14 micrometers.

The robot 102 may include other sensors 1064 as well. For example, capacitive proximity sensors may be used to provide proximity data to adjacent objects. Other sensors 1064 may include radio frequency identification (RFID) readers, near field communication (NFC) systems, coded aperture cameras, and so forth. For example, NFC tags may be placed at various points within the environment to provide landmarks for the autonomous navigation module 928. One or more touch sensors may be utilized to determine contact with a user or other object.

The robot 102 may include one or more output devices 126. A motor 1066 may be used to provide linear or rotary motion. A light 1068 may be used to emit photons. A speaker 1070 may be used to emit sound. A display 1072 may comprise one or more of a liquid crystal display, light emitting diode display, electrophoretic display, cholesterol display, interferometric display, and so forth. The display 1072 may be used to present visible information such as graphics, pictures, text, and so forth. In some implementations, the display 1072 may comprise a touchscreen that combines a touch sensor and a display 1072.

In some implementations, the robot 102 may be equipped with a projector 1074. The projector 1074 may be able to project an image on a surface, such as the floor, wall, ceiling, and so forth.

A scent dispenser 1076 may be used to emit one or more smells. For example, the scent dispenser 1076 may comprise a plurality of different scented liquids that may be evaporated or vaporized in a controlled fashion to release predetermined amounts of each.

A handle release 1078 may comprise an electrically operated mechanism such as one or more of a motor, solenoid, piezoelectric material, electroactive polymer, or a shape-memory alloy. In one implementation, the handle release 1078 may release a latch and allows a spring to push the carrying handle into the deployed position. In another implementation, the electrically operated mechanism may provide the force that deploys the carrying handle. Retraction of the carrying handle may be manual or electronically activated.

In other implementations, other 1080 output devices may be utilized. For example, the robot 102 may include a haptic output device that provides output that produces particular touch sensations to the user. Continuing the example, a motor 1066 with an eccentric weight may be used to create a buzz or vibration to allow the robot 102 to simulate the purr of a cat.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   a first strip stowed in a coil;
   a first telescoping section, a second telescoping section, and a third telescoping section, wherein:
      the third telescoping section fits at least partially within the second telescoping section;
      the second telescoping section fits at least partially within the first telescoping section; and the first strip passes through the first telescoping section, the second telescoping section, and the third telescoping section;
one or more actuators to extend and retract at least a portion of the first strip; and
a payload attachment piece that is affixed to a distal end of the first strip.

2. The device of claim 1, further comprising:
a first retention mechanism to hold the at least a portion of the first strip;
a second strip;
a second retention mechanism to hold at least a portion of the second strip; and
wherein:
the one or more actuators extend and retract the first strip and the second strip, wherein an extended portion of the first strip has a first cross section with one or more curves and an extended portion of the second strip has a second cross section with one or more curves; and
the payload attachment piece is further affixed to a distal end of the second strip.

3. The device of claim 1, wherein:
the payload attachment piece is affixed to a distal end of the third telescoping section.

4. The device of claim 3, wherein:
the first telescoping section comprises a first rigid material;
the second telescoping section comprises a flexible material; and
the third telescoping section comprises a second rigid material.

5. The device of claim 4, the flexible material comprising an elastomer and a plurality of resilient wires arranged substantially parallel to a long axis of the second telescoping section.

6. The device of claim 1, wherein, upon application of a force produced by the one or more actuators and transmitted by the first strip, the first telescoping section is displaced first, the second telescoping section is displaced second, and the third telescoping section is displaced third.

7. The device of claim 1, further comprising:
a chassis; and
a breakaway fitting that couples the first telescoping section to the chassis, wherein the breakaway fitting is configured to decouple the first telescoping section from the chassis upon application of a lateral force that exceeds a threshold value, the breakaway fitting comprising one or more of:
a first mechanical interface feature affixed to the first telescoping section and a second mechanical interface feature affixed to the chassis;
a first magnet affixed to the first telescoping section, or
a second magnet affixed to the chassis.

8. The device of claim 1, further comprising:
a second strip;
a first material affixed to the first strip, the first material providing a first engagement feature along a first edge of the first strip and a second engagement feature along a second edge of the first strip;
wherein an extended portion of the first strip is substantially parallel to an extended portion of the second strip;
a second material affixed to the second strip, the second material providing a third engagement feature along a first edge of the second strip and a fourth engagement feature along a second edge of the second strip;

a joining mechanism to, during extension of the first strip and the second strip:
direct the first engagement feature into the third engagement feature; and
direct the second engagement feature into the fourth engagement feature; and
the joining mechanism to, during retraction of the first strip and the second strip:
remove the first engagement feature from the third engagement feature; and
remove the second engagement feature from the fourth engagement feature.

9. The device of claim 1, the first strip comprising one or more of spring steel or fiberglass that is formed to produce one or more curves when extended.

10. A device comprising:
a first strip that is stowed in a first coil;
a second strip that is stowed in a second coil;
one or more actuators to extend and retract at least a portion of one or more of the first strip or the second strip;
a plurality of telescoping sections through which an extended portion of one or more of the first strip or the second strip is disposed; and
a payload attachment piece that is affixed to a distal end of one or more of the first strip or the second strip.

11. The device of claim 10, wherein a cross section of the extended portion of the first strip comprises at least one bend with a radius of curvature of at least 1 millimeter.

12. The device of claim 10, further comprising:
one or more rollers configured to flatten the first strip prior to stowage of the at least a portion of the first strip in the first coil.

13. The device of claim 10, the first strip comprising one or more of:
spring steel,
fiberglass,
a shape-memory alloy, or
a shape-memory polymer.

14. The device of claim 10, wherein:
one or more of the plurality of telescoping sections are resilient such that they return to substantially a previous shape after deformation.

15. The device of claim 14, at least one of the one or more of the plurality of telescoping sections that are resilient further comprising:
a body comprising an elastomeric material; and
a plurality of resilient wires embedded within the elastomeric material, the plurality of resilient wires arranged substantially parallel to a long axis of the body.

16. The device of claim 10, further comprising:
a computing device;
one or more sensors attached to the payload attachment piece;
a cable that has a distal end connected to the one or more sensors and a proximal end that is connected to the computing device; and
an actuator controller connected to the computing device, wherein the actuator controller operates the one or more actuators to extend and retract the at least a portion of the first strip to raise and lower the one or more sensors.

17. A device comprising:
a first retention enclosure that holds at least a portion of a first strip arranged into a first coil;
a second retention enclosure that holds at least a portion of a second strip arranged into a second coil;

a motor to move the first strip and the second strip;

a bottom telescoping section, a middle telescoping section, and an upper telescoping section, wherein the upper telescoping section fits within the middle telescoping section and the middle telescoping section fits within the bottom telescoping section; and a payload attachment piece that is affixed to at least a distal end of the first strip and a distal end of the second strip.

18. The device of claim 17, further comprising:

a first exit piece that has a first curved passageway through which the distal end of the first strip passes, wherein the first curved passageway corresponds to a first cross-sectional curve of the first strip as the first strip exits the first curved passageway; and a second exit piece that has a second curved passageway through which the distal end of the second strip passes, wherein the second curved passageway corresponds to a second cross-sectional curve of the second strip as the second strip exits the second curved passageway.

19. The device of claim 18, wherein:

the first strip comprises a first resilient material and has a proximal end and the distal end;

the second strip comprises a second resilient material and has a proximal end and the distal end; and the motor moves the first strip through the first exit piece and moves the second strip through the second exit piece.

20. The device of claim 17, wherein:

the bottom telescoping section comprises a first rigid plastic material;

the upper telescoping section comprises a second rigid plastic material; and the middle telescoping section comprises an elastomeric material embedded with resilient longitudinal wires.

* * * * *